(12) United States Patent
Beaumariage et al.

(10) Patent No.: US 12,437,852 B1
(45) Date of Patent: Oct. 7, 2025

(54) SYSTEM AND METHOD FOR AUDIBLE PRESCRIPTION LABEL INFORMATION USING RFID PRESCRIPTION PACKAGING

(71) Applicant: CVS Pharmacy, Inc., Woonsocket, RI (US)

(72) Inventors: Sophia Beaumariage, Franklin, MA (US); Scott Capista, Lincoln, RI (US); Lindsey Desrosiers, Dartmouth, MA (US); Misa Q. Hoang, Cumberland, RI (US); Melissa Lambert, Dartmouth, MA (US); Joseph Spears, Johnston, RI (US)

(73) Assignee: CVS Pharmacy, Inc., Woonsocket, RI (US)

( * ) Notice: Subject to any disclaimer, the term of this patent is extended or adjusted under 35 U.S.C. 154(b) by 350 days.

(21) Appl. No.: 17/217,925

(22) Filed: Mar. 30, 2021

Related U.S. Application Data

(60) Provisional application No. 63/001,956, filed on Mar. 30, 2020.

(51) Int. Cl.
*G16H 20/10* (2018.01)
*A61J 1/03* (2023.01)
(Continued)

(52) U.S. Cl.
CPC .............. *G16H 20/10* (2018.01); *A61J 1/03* (2013.01); *G06K 7/10297* (2013.01);
(Continued)

(58) Field of Classification Search
CPC ........ G16H 20/10; G16H 10/60; G16H 40/20; G16H 40/67; G16H 70/40; A61J 1/03;
(Continued)

(56) References Cited

U.S. PATENT DOCUMENTS 7,061,831 B2   6/2006   De La Huerga
8,074,875 B2  12/2011   Ollikainen et al.
(Continued)

FOREIGN PATENT DOCUMENTS

WO   2004/090826   10/2004

OTHER PUBLICATIONS

Apple Vis, "ScripTalk Mobile," Oct. 8, 2019, retrieved from https://www.applevis.com/apps/ios/medical/scriptalk-mobile on Dec. 12, 2019, 4 pgs.
(Continued)

*Primary Examiner* — Devin C Hein
*Assistant Examiner* — Dawn Trinah Haynes
(74) *Attorney, Agent, or Firm* — Patent Law Works LLP

(57) ABSTRACT

Pharmacy data systems, mobile computing devices, and methods for audible prescription label information using near-field encoded prescription packaging, such as prescription containers with radio frequency identifier (RFID) tags, are described. A mobile computing device, such as a smartphone, may include a near-field reader that reads a first set of prescription label information from an RFID attached to a prescription container. Using the first set of prescription label information, a second set of prescription label information may be accessed, such as from a remote pharmacy data system. The two sets of prescription label information may be used to populate an audible script template and converted to an audible human voice for delivery to the user.

21 Claims, 7 Drawing Sheets

(51) Int. Cl.
| | |
|---|---|
| *G06K 7/10* | (2006.01) |
| *G06K 19/07* | (2006.01) |
| *G06K 19/077* | (2006.01) |
| *G06Q 20/32* | (2012.01) |
| *G06Q 30/0601* | (2023.01) |
| *G10L 13/02* | (2013.01) |
| *G16H 10/60* | (2018.01) |
| *G16H 40/20* | (2018.01) |
| *G16H 40/67* | (2018.01) |
| *G16H 70/40* | (2018.01) |

(52) U.S. Cl.
CPC ..... *G06K 7/10386* (2013.01); *G06K 19/0723* (2013.01); *G06K 19/0776* (2013.01); *G06Q 20/3272* (2013.01); *G06Q 20/3278* (2013.01); *G06Q 30/0611* (2013.01); *G10L 13/02* (2013.01); *G16H 10/60* (2018.01); *G16H 40/20* (2018.01); *G16H 40/67* (2018.01); *G16H 70/40* (2018.01); *A61J 2205/60* (2013.01)

(58) Field of Classification Search
CPC ............ A61J 2205/60; G06K 7/10297; G06K 7/10386; G06K 19/0723; G06K 19/0776; G06Q 20/3272; G06Q 20/3278; G06Q 30/0611; G10L 13/02
USPC .......................................................... 705/2
See application file for complete search history.

(56) References Cited

U.S. PATENT DOCUMENTS

| | | | |
|---|---|---|---|
| 9,463,901 B2 | 10/2016 | Raistrick et al. | |
| 9,710,608 B2 | 7/2017 | Mikhail | |
| 10,073,998 B1 | 9/2018 | Tran | |
| 11,157,596 B1* | 10/2021 | Eby | G16H 20/10 |
| 2003/0216831 A1* | 11/2003 | Hart | G16H 10/60 |
| 2007/0080815 A1 | 4/2007 | Steinmetz | |
| 2008/0303638 A1 | 12/2008 | Nguyen et al. | |
| 2012/0330665 A1* | 12/2012 | Berkun | G16H 20/13 |
| 2014/0188502 A1 | 7/2014 | Defrank et al. | |
| 2015/0360834 A1* | 12/2015 | Mikhail | G16H 20/13 |
| 2016/0217270 A1* | 7/2016 | Ferguson | G06H 20/10 |
| 2017/0220741 A1* | 8/2017 | Toupin | G16H 10/60 |
| 2018/0121615 A1 | 5/2018 | Rozier et al. | |
| 2021/0117881 A1* | 4/2021 | Sanchez | G16H 40/20 |

OTHER PUBLICATIONS

En-Vision America, "ScripTalk Station Pharmacy Quick Start Guide," v1.6, En-Vision America, at least as early as Dec. 9, 2019, 26 pgs.
VTT Research, "NFC aid for the visually impaired," Jan. 18, 2012, retrieved from https://www.vttresearch.com/media/news/nfc-aid-for-the-visually-impaired on Dec. 9, 2019, 3 pgs.

* cited by examiner

SYSTEM AND METHOD FOR AUDIBLE PRESCRIPTION LABEL INFORMATION USING RFID PRESCRIPTION PACKAGING

TECHNICAL FIELD

The present disclosure generally relates to pharmaceutical packaging integration with mobile computing devices and pharmacy data systems and, more specifically, using prescription packaging with near-field memory devices to enable access and audible delivery of prescription label information and related pharmacy services.

BACKGROUND

There are a number of solutions available for customers with difficulty reading conventional pharmaceutical labels, such as large print format label information sheets, braille labels, and radio frequency identification (RFID) tags containing or accessing an audio file containing selected information from a prescription label. With the advent of smartphones with near-field readers, there is an opportunity to provide additional functionality around prescription packaging equipped with RFIDs and similar near-field technologies for wirelessly communicating data to the smartphone.

RFID tags and similar near-field memory devices may have a limited storage capacity, particularly for cost-effective use in consumer packaging. They may not have the capacity to store the complete prescription label information for a given prescription. Additionally, prescription and related information may change after a prescription is filled and an RFID tag is encoded with the prescription information. Increasingly, users have access to smartphones with both near-field reader capabilities and pharmacy applications that integrate with pharmacy data systems over a network, such as the internet.

Integration of RFID tag data, mobile computing device capabilities, and remote pharmacy data systems may present challenges in allocating data, privacy compliant data access, and audible data presentation and navigation.

SUMMARY

Various aspects for audible prescription label information presented to a user through a mobile computing device using prescription packaging with near-field memory devices, such as RFID tags, are described.

One general aspect includes a system that includes: a near-field memory device attached to a prescription container, where the near-field memory device is configured to store a first set of prescription label information; and a mobile computing device that includes: a processor, a memory, a near-field reader configured to read the first set of prescription label information from the near-field memory device, and a speaker. The mobile computing device is configured to: access, responsive to reading the first set of prescription label information, a second set of prescription label information from at least one source other than the near-field memory device; populate, using the first set of prescription label information and the second set of prescription label information, an audible script template; and deliver, through the speaker, the populated audible script template as an audible human voice.

Implementations may include one or more of the following features. The mobile computing device further may include a local non-volatile memory configured to store at least a portion of the second set of prescription label information. The mobile computing device may be further configured to read, from the local non-volatile memory, at least a portion of the second set of prescription label information to access the second set of prescription label information. The mobile computing device may further include a communication unit configured for network communication with at least one remote prescription label information source. The mobile computing device may be further configured to query, from the at least one remote prescription label information source, at least a portion of the second set of prescription label information to access the second set of prescription label information. The mobile computing device may be further configured to: determine whether a user has been verified for access to a verified-user portion of the second set of prescription information; selectively access, responsive to determining that the user has been verified for access, a verified-user portion of the second set of prescription information; and selectively access, responsive to determining that the user has not been verified for access, an unverified-user portion of the second set of prescription information. The first set of prescription information may include at least one index value and the mobile computing device may be further configured to use the at least one index value to access at least a portion of the second set of prescription information. The at least one index value may include a patient identifier associated with the prescription container and the second set of prescription information may include patient data not encoded in the first set of prescription information. The second set of prescription information may include a service status and offer data associated with the patient identifier and the mobile computing device may be further configured to: populate, using the offer data, an offer template for pharmacy services in the audible script template; receive, from a user, a navigation indicator to accept an offer in the offer template; and initiate, responsive to receiving the navigation indicator, an electronic transaction based on the offer. The first set of prescription information may relate to a first prescription for a patient and the second set of prescription information may include drug conflict data associated with the patient identifier, the first prescription for the patient, and at least one different prescription for the patient. The at least one index value may include a prescription identifier associated with the prescription container and the second set of prescription information may include prescription data not encoded in the first set of prescription information. The at least one index value may include a drug identifier associated with the prescription container; the second set of prescription information may include drug data not encoded in the first set of prescription information; and the drug data in the second set of prescription information may be selected from warning label data, drug manufacturer data, description of tablet, pharmacy advice data, and adverse drug interaction data. The at least one index value may include a pharmacy identifier associated with the prescription container; the second set of prescription information may include pharmacy data not encoded in the first set of prescription information; and the mobile computing device may be further configured to: populate, using the pharmacy data, an offer template for contacting a pharmacy associated with the pharmacy identifier; receive, from a user, a navigation indicator to accept contacting the pharmacy; and initiate, responsive to receiving the navigation indicator, communication with the pharmacy. The audible script template may include: field names corresponding to prescription data fields in the first set of prescription information and the second set of prescription information; and an audible label script that may include field names for populating prescription data fields and natural language elements for presenting the prescription data fields. The first set of prescription information and the second set of prescription information may correspond to prescription data fields; the audible script template may include at least one audible navigation template configured to organize the prescription data fields for navigation by a user; and the mobile computing device may be further configured to: receive, from a user, a navigation indicator responsive to the audible script template; and select, based on the navigation indicator, a next location in the audible script template to deliver through the speaker. The mobile computing device may further include a graphical user interface display and the mobile computing device may be further configured to: display the populated audible script template on the graphical user interface display; and process, using a text-to-speech converter, the populated audible script template to generate the audible human voice delivered through the speaker. The system may further include a pharmacy computing system configured to: determine an encoder data feed for the prescription container, where the encoder data feed may include the first set of prescription information; encode the first set of prescription information from the encoder data feed to the near-field memory device; and validate that the first set of prescription information is stored in the near-field memory device.

Another general aspect includes a computer-implemented method that includes: reading, by a mobile computing device, a first set of prescription label information from a near-field memory device attached to a prescription container; accessing, by the mobile computing device and responsive to reading the first set of prescription label information, a second set of prescription label information from at least one source other than the near-field memory device; populating, by the mobile computing device and using the first set of prescription label information and the second set of prescription label information, an audible script template; and generating, by the mobile computing device, an audible human voice from the populated audible script template.

Implementations may include one or more of the following features. Accessing the second set of prescription label information may include reading, from a local non-volatile memory of the mobile computing device, at least a portion of the second set of prescription label information. Accessing the second set of prescription label information may include: establishing, by the mobile computing device, network communication with at least one remote prescription label information source; and querying, by the mobile computing device and from the at least one remote prescription label information source, at least a portion of the second set of prescription label information. Accessing the second set of prescription label information may include: determining, by the mobile computing device, whether a user has been verified for access to a verified-user portion of the second set of prescription information; selectively accessing, responsive to determining that the user has been verified for access, a verified-user portion of the second set of prescription information; and selectively accessing, responsive to determining that the user has not been verified for access, an unverified-user portion of the second set of prescription information. The computer-implemented method may include: determining at least one index value from the first set of prescription information; and using the at least one index value to access at least a portion of the second set of prescription information.

Still another general aspect includes a mobile computing device that includes: a processor; a memory, a near-field reader configured to read a first set of prescription label information from a near-field memory device attached to a prescription container; a speaker; a text-to-voice converter configured to generate audible human voice from text data and deliver the audible human voice through the speaker; and an audible label function configured to: initiate the near-field reader to read the first set of prescription label information; access, responsive to the first set of prescription label information, a second set of prescription label information from at least one source other than the near-field memory device; populate, using the first set of prescription label information and the second set of prescription label information, an audible script template; and initiate the text-to-voice converter to generate, from the audible script template, and deliver, through the speaker, audible human voice of at least a portion of the first prescription label information and a portion of the second prescription label information.

The various examples advantageously apply the teachings of pharmacy data systems and mobile computing devices to improve the functionality of such computer systems. The various examples include operations to overcome or at least reduce the issues in previous pharmacy data systems and/or mobile computing devices discussed above and, accordingly, are more reliable, efficient, and/or functional than other mobile computing devices and pharmacy data systems for delivering audible prescription label information. That is, the various examples disclosed herein include hardware and/or software with functionality to improve delivery of audible prescription label information based on near-field memory devices with encoded prescription label information, such as by populating an audible label script with prescription label information from both an RFID tag and other data sources indexed by information in the RFID tag. Accordingly, the examples herein provide various improvements to pharmacy data systems and/or mobile computing devices.

It should be understood that language used in the present disclosure has been principally selected for readability and instructional purposes, and not to limit the scope of the subject matter disclosed herein.

DETAILED DESCRIPTION

Pharmacy workflow may include a process for encoding prescription label information on an RFID tag (or other near-field memory device) attached to a prescription package or container, such as a prescription bottle, blister pack, or other prescription packaging. Prescription label information data may be accessed and streamed from an enterprise pharmacy data system and encoded as data, such as text data, onto an RFID tag, which is or will be affixed to the prescription container. A digital application may be installed on one or more customer devices, such as a customer's smartphone, tablet, smartwatch, or other mobile computing device, and operate in conjunction with a near-field communication (NFC) unit or near-field reader in the device to read and decode the data stored on the RFID. The digital application may then convert the data to speech, when activated by the user, to enable a visually impaired customer to hear the contents of the label and related information.

In some examples, the data from the RFID tag may be processed through one or more audible script templates stored in the mobile device or accessible through a network on (or operating in conjunction with) the enterprise pharmacy data system to present the stored data in a more natural or user-friendly audible presentation that may integrate both prescription label information from the RFID tag and information from other sources. The digital application may access additional enterprise data and/or services and integrate that added data and services into the audible presentation of the prescription information from the label and prompt additional actions, such as accessing related offers or services. In some examples, the prescription label information data may be encoded as text with a format or markup that defines data fields and labels for use by the digital application in parsing the encoded data and integrating or populating it into additional templates and audible interactions. In some examples, the digital application may support both an online and offline mode, where the offline mode enables limited functionality using only RFID data and locally stored templates and other information on the mobile device and the online mode supports enhanced capabilities based on real-time access to the enterprise pharmacy data system and supported services.

In some examples, support for RFID encoded labeling may be configured at the enterprise level and may allow enterprise administrators to set, enable, or disable the functionality at the chain, state, and/or store level. If the RFID encoded labeling is enabled, related encoding workflow tasks may automatically be enabled and inserted into the pharmacy workflow system for filling prescriptions. The encoding workflow tasks may be selectively enabled based on whether an appropriate value for a visually impaired indicator or similar visual status indicator is present in the patient record.

Figure 1:
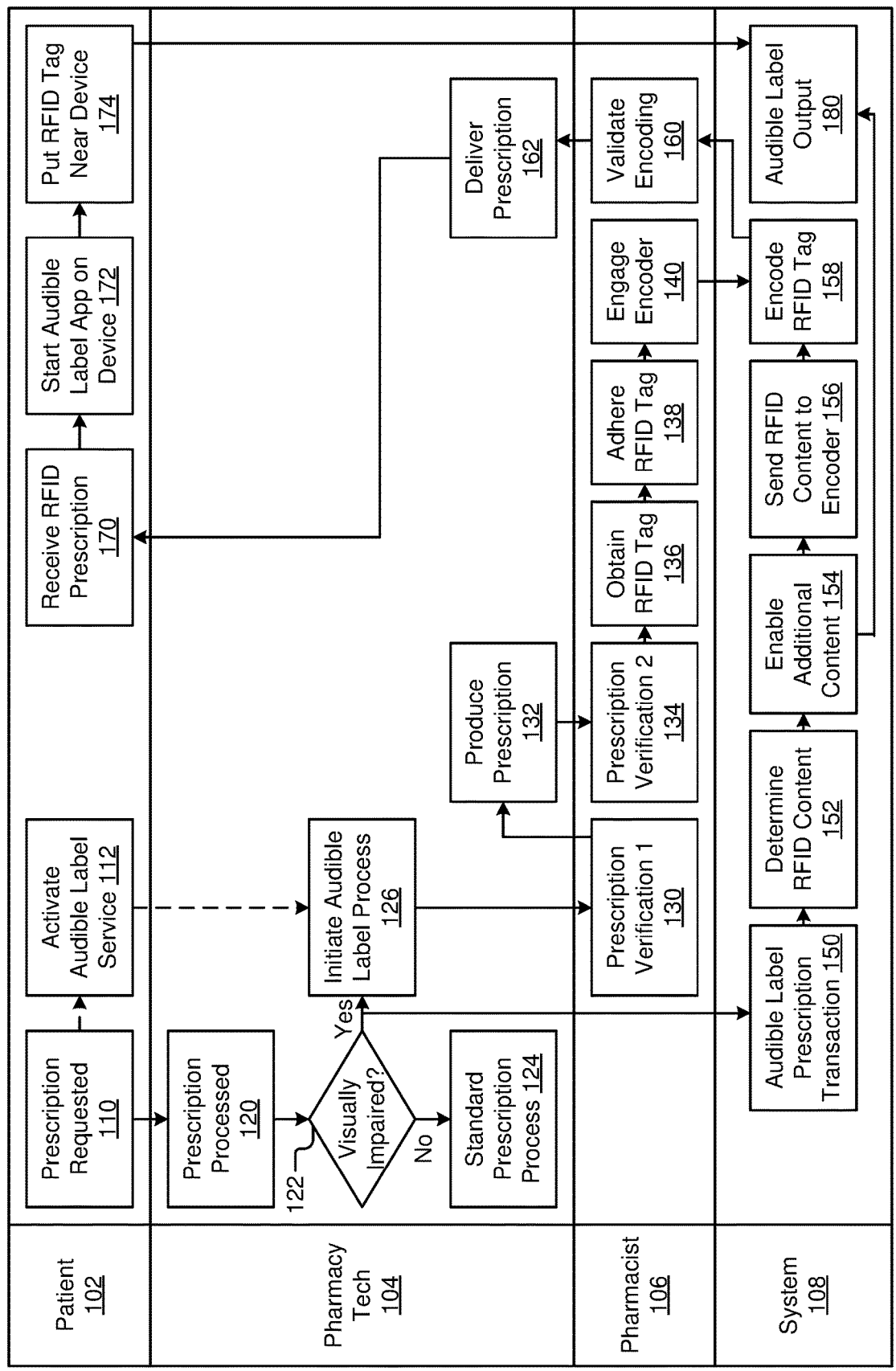
FIG. 1 schematically illustrates a pharmacy and customer workflow for delivery of audible prescription label information.

FIG. 1 shows an example workflow 100 for encoding RFID tags with prescription label information data during a prescription fill process and using the encoded RFID tag to provide audible label output, such as an audible human voice delivering the prescription label information. Workflow 100 includes a customer or patient 102, a pharmacy technician or tech 104, a pharmacist 106, and a system 108. Note that the human roles in workflow 100 are examples only and various tasks may be performed by different pharmacy personnel, users associated with patient 102 (such as caregivers), and/or other people in the prescription generation, fulfillment, and use chain. In some examples, system 108 may include: a variety of pharmacy equipment, such as a pharmacy computing system, RFID encoder, and NFC reader; remote enterprise pharmacy data systems accessed over a network; the customer's mobile computing device with the corresponding digital application(s); and an RFID tagged prescription container. For example, system 200 in FIG. 2 may embody system 108, where audible label engine 210 may be embodied or hosted in mobile device 214, enterprise pharmacy data systems 212, and/or a combination thereof.

At block 110, a prescription is requested. For example, patient 102 may select a particular pharmacy to have their prescription filled and physically or electronically deliver the prescription to the pharmacy (or have the prescribing doctor deliver it directly). At block 112, an audible label service may be activated. For example, patient 102 or another customer filling the prescription for patient 102 may indicate to pharmacy tech 104 or through another activation process, such as an online form or customer service communication, that audible label packaging is desired and a visually impaired indicator and/or audible label indicator may be added to the patient's patient data, such as a patient record in the enterprise pharmacy data system.

At block 120, the received prescription may be processed. For example, pharmacy tech 104 may receive the prescription and enter it into a pharmacy data system through a pharmacy computing system and/or verify prescription and patient information received electronically. At block 122, whether or not patient 102 is visually impaired may be evaluated. For example, pharmacy tech 104 and/or system 108 may determine whether a visually impaired indicator is present in the patient data for patient 102 and/or pharmacy tech 104 may ask patient 102 (or another customer filling the prescription for patient 102) whether he or she would like prescription packaging for the visually impaired. If no, workflow 100 may proceed to block 124 for standard prescription processing. If yes, workflow 100 may proceed to block 126 to initiate an audible label process for filling the prescription. In addition, workflow 100 may proceed to block 150 to initiate a new audible label prescription transaction through system 108.

At block 130, a first prescription verification process (prescription verification 1) may be completed. For example, pharmacist 106 may verify that the prescription information and prescribed drug and dosage comply with safety and other pharmacy standards. At block 132, the prescription may be produced. For example, pharmacy tech 104 may place a prescribed number of doses for the prescribed drug and dosage in a prescription container and/or select a corresponding prepackaged drug (already in a prescription container). At block 134, a second prescription verification process (prescription verification 2) may be completed. For example, pharmacist 106 may verify that the prescription produced in the prescription container corresponds to the prescription information and prescribed drug and dosage in the prescription. Note that this portion of the prescription fulfillment process may be similar to the standard prescription process.

At block 136, an RFID tag may be obtained. For example, pharmacist 106 may select an RFID tag with a form factor compatible with the prescription container being used. At block 138, the RFID tag may be adhered or otherwise attached to the prescription container. For example, pharmacist 106 may remove an adhesive backing from the selected RFID tag and adhere it to an appropriate surface of the prescription container. In some cases, an RFID tag May already be present on the prescription container, such as being manufactured with the prescription container or attached to the container by pharmacy tech 104.

At block 140, a near-field encoder may be engaged. For example, pharmacist 106 may place the prescription container with the RFID tag on, in, or near a near-field encoder configured to encode data on the RFID tag. In some examples, prescription verification tasks at blocks 130 and 134 may be supported by a pharmacy workflow application running on a pharmacy computing system used by pharmacist 106. The pharmacy workflow application may include access to patient data and prescription data stored in a patient record or file and/or a prescription record or file. The near-field encoder may be in communication with the pharmacy computing system and configured to receive prescription label information for encoding on the RFID tag based on the prescription being processed by the pharmacy computing system and pharmacist 106, as further explained below with regard to system 108. In some examples, the pharmacy workflow application may include a series of interfaces or notifications to guide pharmacist 106 through blocks 136, 138, 140, and/or 160.

At block 150, an audible label prescription transaction may be initiated. For example, when system 108 and/or pharmacy tech 104 initiate the audible label process based on a visually impaired indicator at block 126, it may indicate to the pharmacy workflow application used for fulfilling the prescription that an audible label subprocess or specific steps or features in the workflow application and corresponding user interface should be enabled. In addition, the audible label transaction at block 150 may mark the prescription record and/or prescription fulfillment event record as an audible label transaction for enterprise tracking and reporting.

At block 152, RFID tag content may be determined. For example, system 108 may determine the prescription label information to be encoded on the RFID tag, such as a set of prescription label information fields and corresponding data values for those fields. In some examples, a format or template for encoding the RFID tag may be selected based on the RFID tag type and/or capacity and the data fields may be populated from the enterprise pharmacy data system, such as corresponding prescription and patient records.

At block 154, additional content may be enabled. For example, system 108 may determine one or more index values, such as patient identifier, prescription identifier, drug identifier, and/or pharmacy identifier, that are included in the RFID tag data and act as index values for accessing additional information in response to reading the RFID tag at a later time, such as by the customer's mobile computing device for an audible label delivery event. In some examples, enabling additional content may include configuration settings and/or access credentials being configured or added to the patient or prescription records and/or digital application on the customer's mobile computing device.

At block 156, the RFID tag content may be sent to the near-field encoder. For example, the pharmacy computing system used by pharmacist 106 may receive or generate a set of prescription label information, such as a series of prescription label data fields for encoding in the RFID tag. At block 158, the RFID tag may be encoded. For example, the pharmacy computing system may send a data feed to the attached near-field encoder, which may in turn buffer the set of prescription label information and encode it in the RFID tag engaged by pharmacist 106 at block 140.

At block 160, correct encoding of the RFID tag may be validated. For example, pharmacist 106 and/or system 108 may use a near-field reader to check that the data feed was correctly stored in the RFID tag and that the set of prescription label data values on the RFID tag match the prescription. At block 162, the prescription may be delivered to patient 102 or responsible customer. For example, pharmacy tech 104 may deliver the prescription container, including the attached RFID tag, and any accompanying prescription materials to patient 102, such as at a pickup counter, drive-thru, or delivery service (such as prescriptions by mail).

At block 170, the prescription container with the RFID tag may be received. For example, patient 102 or another customer assisting patient 102 may receive the prescription. When patient 102 wishes to use the audible label, an audible label application or function may be started on a mobile computing device. For example, patient 102 may have downloaded a pharmacy application containing an audible label function to his or her mobile computing device, such as a smartphone, and may open the application and/or start the audible label function by tapping an icon or using a voice command. At block 174, the RFID tag may be put near the mobile computing device. For example, patient 102 may place the prescription container with the RFID tag within the near-field range of the near-field reader in the mobile computing device to trigger an audible label event.

At block 180, audible prescription label information may be delivered by a human voice through a speaker associated with the mobile computing device. For example, the audible label function may: use the near-field reader to read the set of prescription information fields from the RFID tag; access additional content from other sources, such as local application data in the mobile computing device and/or remote enterprise pharmacy data systems; populate an audible label script with a prescription label information data values from the RFID tag and the additional content; and convert the populated audible label script to human voice using a text-to-voice or text-to-speech converter. The structure, functions, and operation of system 108 will be further explained with regard to FIGS. 2-6.

Figure 2:
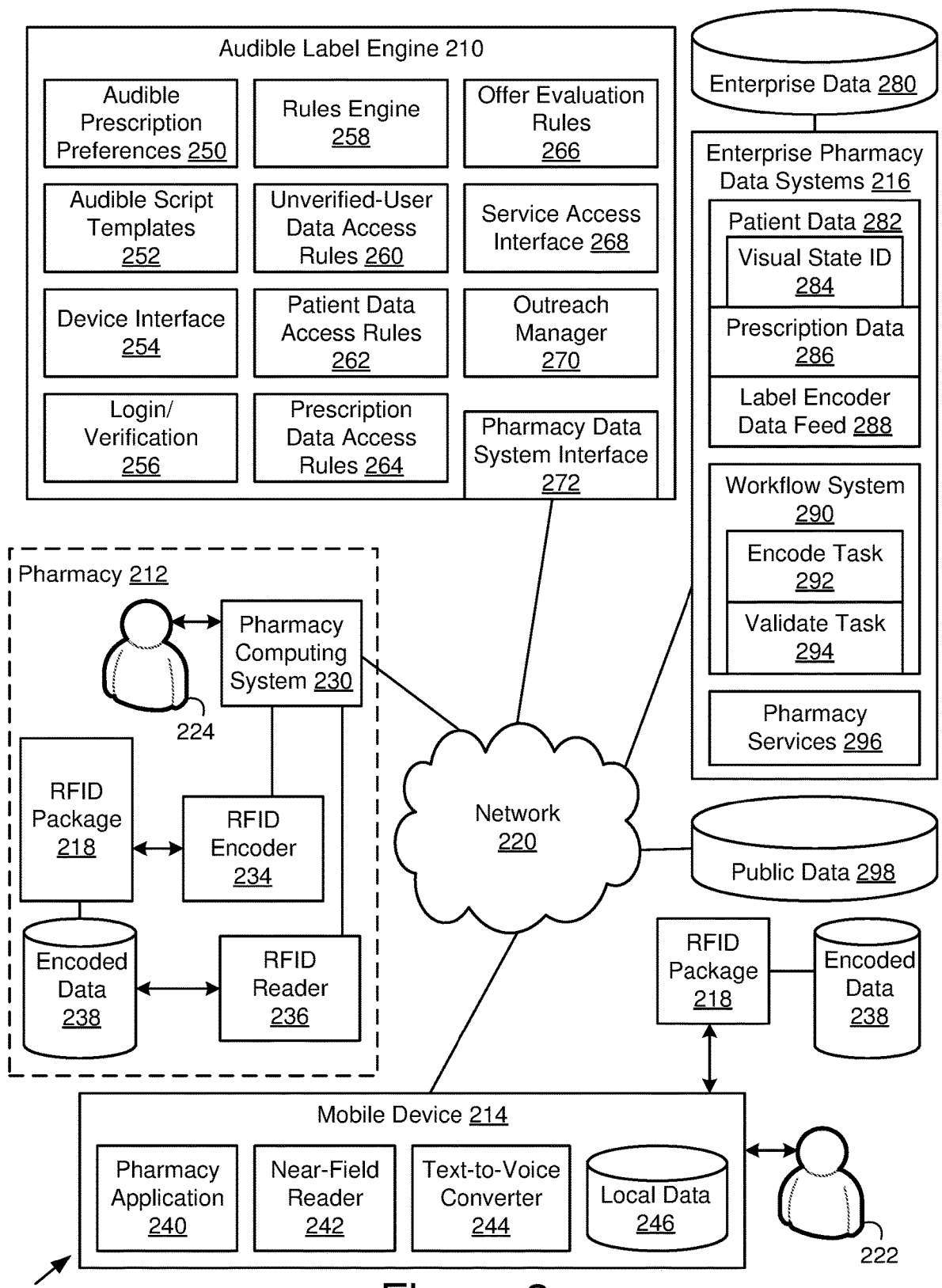
FIG. 2 schematically illustrates a system for delivery of audible prescription label information.

As shown in FIG. 2, an audible label engine 210 may enable retail pharmacy information system 212, a customer's mobile device 214, and various enterprise data systems 216 to encode and use the prescription label information in an RFID package 218 to provide audible label information to a user 222. Pharmacy information system 212, mobile device 214, enterprise pharmacy data systems 216, and/or various components of audible label engine 210 may communicate with one another over network 220, such as the internet. In some examples, network 220 may include one or more conventional data communication networks, such as a local area network (LAN), a wide area network (WAN), a telephone network, such as the public switched telephone network (PSTN), an intranet, the internet, or any other suitable communication network or combination of communication networks. Audible label engine 210 may be embodied in a combination of software modules supporting a pharmacy application 240, stored locally on mobile device 214 and/or served over network 220 from enterprise pharmacy data systems 216. For example, some data and functions may be stored in local data 246 on mobile device 214, while other data and functions may be accessed through an application protocol interface (API) in the enterprise pharmacy data systems 216.

In some examples, RFID package 218 may include a prescription container and an attached (or embedded) RFID tag encoded at a pharmacy using retail pharmacy information system 212. For example, RFID package 218 may use an adhesive NFC tag or other near-field tag to store encoded text data for a series of data fields, such as a comma delimited data set or markup data set (containing markup tags to denote fields). In the context of RFID package 218, an attached RFID tag, such as a near-field memory device, may include any form of physically associating the RFID tag with the corresponding prescription container. For example, the attached RFID tag may include removably attached adhesive tags, printed or deposited tags on a container surface or label, embedded or integrated tags (such as in a cap, base, package insert, etc.), and other structures for retaining the RFID tag in close physical proximity to the prescription container. Pharmacy computing system 230 may be used by pharmacy staff 224, such as a pharmacist and/or pharmacy technician, to receive and fulfill the prescription (as described with regard to FIG. 1) and encode RFID package 218 during the fulfillment process. In some examples, pharmacy computing system 230 may use a combination of local computing resources and network computing resources in enterprise pharmacy data systems 216 for the encoding process.

A pharmacy or similar workspace may include multiple workstations for processing and fulfilling drug prescriptions wherein one or more workstations perform one or more stages involved in processing prescriptions. Workstations may include terminals for pharmacy computing system 230 and associated peripherals, such as RFID encoder 234 and RFID reader 236. Each workstation is designated, and, optionally, is configured, to accomplish one or more tasks. Workstation tasks can be defined in terms of the roles and responsibilities, as well as the skill levels required, of persons who staff each workstation. Further, workstation tasks can be further defined to limit or focus pharmacy staff-customer interfaces whereby a designated workstation is limited or focused to one or more specific pharmacy-customer interfaces such as, for instance, walk-in drop-off workstations can be limited to interacting with walk-in customers, while drive-thru workstations can be limited to interacting with drive-thru customers. In addition, definition of workstation tasks can be directed to limiting staff to a single or primary pharmacy customer interface of a workstation to ensure effective customer communication and efficient workflow.

The designated workstations and defined tasks help to create a stage-by-stage process or a compartmentalized workflow whereby each processing stage is handled and/or completed at one or more workstations by one or more staff persons having the requisite skill level, e.g., registered pharmacist (RPh), certified or otherwise trained pharmacy technician (CT), a customer support associate (CSA) or other support person. In addition, the workstations and tasks are so defined to help to permit early detection and resolution of issues or problems that can occur during processing. Further, the defined workstations and tasks help to ensure pharmacy communication with customers concerning prescription problems and help a pharmacy to provide customers with relatively accurate prescription pick-up times that meet customers' needs and expectations.

In some examples, pharmacy computing system 230 may provide access to an enterprise-level workflow system 290 via network 220. For example, system queues and interfaces provided through pharmacy computing system 230 may guide pharmacy staff through prescription fulfillment tasks. In some examples, addition of additional workflow tasks, such as the encoding task, may include adding or modifying one or more interface screens to guide the pharmacist through the process of encoding and verifying the contents of the RFID tag. An audible label fulfillment process may be triggered by a visual state identifier 184 in patient data 282 of enterprise pharmacy data systems 216 and cause the additional workflow tasks to be displayed, supported, and tracked through pharmacy computing system 230. For example, the visual state identifier may include a visually impaired value and/or an audible label enabled value.

In some examples, encode task 292 may include process steps for encoding the prescription label information in the RFID tag of RFID package 218 using an RFID encoder 234. For example, encode task 292 may enable pharmacy computing system 230 to initialize RFID encoder 234, clear any previously buffered prescription label data, determine a format or template for the set of prescription label information data fields to be encoded, receive or generate the set of prescription label information data values, send the set of data fields to RFID encoder 234, and activate encoding by RFID encoder 234, such as an NFC encoder or other near-field encoder. RFID encoder 234 may store the set of data fields as encoded data 238 in the RFID tag. For example, encoded data 238 may include a sequence of text values (with or without markup to designate field identifiers) in accordance with the encoding format or template for the selected prescription label information fields. Encoded data 238 may be stored in a near-field memory device, such as an NFC tag or other RFID memory device with near-field frequencies and capabilities. In some examples, enterprise pharmacy data systems 216 may provide access to patient data 282 and prescription data 286 for determining the data field values for the set of prescription label information. For example, patient data 282 and prescription data 286 may be accessed and/or updated by pharmacy computing system 230 for supporting the prescription fulfillment workflow and encode task 292 may include selecting the set of prescription label information fields to be accessed for encoding.

In some examples, enterprise data systems 216 may select the data fields from patient data 282 and prescription data 286 and format the set of data field values in a label encoder data feed 288 that may be received by pharmacy computing system 230 and send to RFID encoder 234 for encoding in encoded data 238. For example, label encoder data feed 288 may be configured to selectively provide data fields from a prescription record (prescription data 286) and/or patient record (patient data 282) formatted as a text feed with predetermined formatting or markup for identifying specific fields. An example data feed may include (but is not limited to):

(1) Patient Name
(2) Drug Name
(3) Sig (directions)
(4) Extended sig, if present
(5) Auxiliary Label Information
(6) Quantity
(7) Drug Expiration
(8) Refills
(9) Prescription Expiration
(10) Prescriber
(11) Prescription Number
(12) Pharmacy Name
(13) Pharmacy Phone Number Label encoder data feed 288 may be configured to send the most current version of the label data and may include logic to account for edits from any fill status (i.e. Print Ready, Verify Ready, Waiting Bin, Sold). Label encoder data feed 288 may include a predefined format including all specified data elements and associating literals or other tags with each element or field. In some examples, label encoder data feed 288 may support multiple languages based on an audible prescription preference and/or general language preference for the patient. For example, the data feed may be sent in English, Spanish, or another supported language based on the patient's preferred language.

Encode task 292 may be enabled for workflow system 290 when a patient's audible label indicator set to yes. Encode task 292 may be initiated for every prescription filled for the patient (first fill, refills, partial fills, completion of partial fills, etc.). The task may be initiated after successful completion of product verification (credential by pharmacist) workflow tasks. For example, an additional screen may display to initiate audible label encode workflow for the prescription. The interface may display all of the label information to be sent to the encoder. In some examples, the interface may display label information fields to be included in the encoded set of prescription label information and other label information fields that may be available from other sources through audible label engine 210 during an audible label event and, for example, color code the different data fields according to whether they are encoded, available online or offline, and/or available for verified or unverified users. A prompt message may display on the screen to prompt the pharmacist to obtain an RFID tag, place it on the prescription container, and place the container on the encoder for encoding. Navigation options displayed on the interface may include:
 (1) Encode: to initiate the RFID encoder to encode the label data on the RFID positioned on the encoder;
 (2) Bypass: to continue without encoding the RFID tag (which may generate an error message); and
 (3) Continue (displays once initial tag encoded): to continue to the next step.
One or more error messages may be displayed for encoding failure conditions, such as encoder not available, encoder error, package/RFID not detected, etc. These error conditions may be selectively displayed on the interface as a popup for any failed transaction to the encoder.

In some examples, encode task 292 for creating additional audible labels outside of the verification process may also be available. For example, a prescription edit may prompt the above workflow once prescription verification 2 is completed. In some examples, encode task 292 may be configured to support encoding multiple RFID tags within a single verification (i.e., if prescriptions require multiple bottles to fulfill, multiple RFID tags may be encoded). In some examples, encode task 292 may support multidose packaging and be able to encode prescription information for multiple prescriptions in a multidose data format on a single RFID tag associated with the multidose package.

In some examples, validate task 294 may include process steps for verifying that the set of prescription label information data values were properly encoded in encoded data 238 and can be read by RFID reader 236. For example, validate task 294 may enable pharmacy computing system 230 to initialize RFID reader 236, read the encoded set of data fields from the RFID tag, parse them according to the selected format, and compare the read data values to the data values that were supposed to be encoded in encode task 292. In some examples, pharmacy computing system 230 may use RFID reader 236 with text-to-speech capabilities to convert the text values encoded in RFID package 218 to human voice for verification.

In some examples, once encoding task 292 is complete, a subsequent message may be displayed instructing the pharmacist to place RFID package 218 on RFID reader 236 to verify all information encoded is correct for all prescription containers encoded. Navigation options displayed on the interface may include:
 (1) Enter (to complete the transaction);
 (2) Assume the credentials of the pharmacist performing product verification 2;
 (3) Encode again (if option selected user brought back to previous message on screen); and
 (4) Exit.

After RFID package 218 is loaded and verified using pharmacy computing system 230, the encoded set of prescription label information fields may be accessed by mobile device 214 using its near-field reader 242. Pharmacy application 240 may control or receive data from near-field reader 242, identify the relevant text fields encoded in the RFID tag of RFID package 218, apply an audible script template for presentation to the customer, then use a text-to-voice converter (in a preferred language) to present the information audibly to customer 222 as computer-generated human voice. In some examples, the text information for presentation to the customer, such as the populated audible script template or a portion thereof, may be displayed on a visual interface of mobile device 214 and a screen reader function may include text-to-voice converter 244.

FIG. 2 schematically shows selected modules of audible label engine 210 for supporting audible label events when RFID package 218 is brought into near-field communication with mobile device 214. In some examples, audible label engine 210 may be embodied in an audible label function in pharmacy application 240. For example, pharmacy application 240 may include a general pharmacy application that includes a number of pharmacy-related actions, such as prescription orders/refills, coupons, rewards, clinic visits, e-commerce, insurance information, etc. Some or all of these functions may be supported by a combination of local data 246, such as application data stored to a non-volatile memory in mobile device 214, and remote data accessed through enterprise pharmacy data systems 216 and/or other remote data systems. In some examples, one or more functions of audible label engine 210 may be hosted on enterprise pharmacy data systems 216 and pharmacy application 240 may include an interface or remote function call to a corresponding API in enterprise pharmacy data systems 216. In some examples, audible label engine 210 may be invoked or instantiated for an audible label event. For example, an audible label event may be initiated when encoded data 238 is read from RFID package 218 by near field reader 242/

Audio label engine 210 may include a plurality of modules or subsystems that are stored and/or instantiated in a memory for execution by a processor. For example, mobile device 214 may be a mobile computing device configured similar to the example computing device 600 in FIG. 6. Similarly, modules or submodules hosted by enterprise pharmacy data systems 216 may be hosted on one or more enterprise servers configured similar to example computing device 600 in FIG. 6. In some examples, the plurality of modules or subsystems may be organized based on high-level functional descriptions and may each include a set of functions, parameters, data structures, and interfaces for carrying out the functions of that module or subsystem. For example, audio label engine 210 may include: audible prescription preferences 250 configured to determine whether audible prescription label engine 210 is enabled for any given patient and/or instance of pharmacy application 240; audible script templates 252 configured to define one or more audible script templates for merging encoded data 238, additional sets of prescription label data from other sources, natural language elements for presenting label data to the user, and/or audible and/or tactile navigation elements; device interface 254 configured to determine whether and how audible script templates are displayed visually and/or converted to audible human voice on a given mobile device, as well as voice command and/or tactile navigation interfaces for some examples; login and user verification 256 configured to verify or authenticate user 222 to pharmacy application 240 and/or enterprise pharmacy data systems 216; rules engine 258 configured to execute a set of logical rules for evaluating status and data elements for determining operation of audible label engine for a specific audible label event; unverified-user data access rules 260 that include a set of logical rules for determining data sources that do not require user verification by login/verification 256; patient data access rules 262 that include a set of logical rules for determining patient data sources that require verification, such as patient data 282 and/or patient data stored in local data 246; prescription data access rules 264 that include a set of logical rules for determining prescription data sources that require verification, such as prescription data 286 and/or prescription data stored in local data 246; offer evaluation rules 266 that include a set of logical rules for determining whether an offer may be included the audible script template for a particular audible label event; service access interface 268 configured for accessing pharmacy services in pharmacy application 240 and/or pharmacy services 296; and outreach manager 270 configured for using communication resources in mobile device 214 for initiating outreach during an audible label event. In some examples, the plurality of modules or subsystems may be integrated into audible label engine 210 and/or managed as separate libraries or background processes (e.g., daemon) through APIs or other interfaces.

In some examples, audible label engine 210 may include a pharmacy data system interface 272 configured to manage a plurality of function and/or data source interfaces to enterprise pharmacy data systems 216. For example, one or more enterprise pharmacy data systems 216 may provide network-based interface protocols complying with one or more network protocols, including hypertext transfer protocol (HTTP)/representational state transfer (REST) object interfaces, language-specific interfaces such as Microsoft .Net, Python or C, etc. Pharmacy data system interface 272 may be a component of pharmacy application 240 configured to manage the library of available interfaces, as well as accounts, login, user authentication, and/or other credentials for accessing resources in enterprise pharmacy data systems 216.

In some examples, audible prescription preferences 250 may include configuration parameters stored in pharmacy application 240 and/or patient data 282 to determine whether audible prescription label engine 210 is enabled for any given patient and/or instance of pharmacy application 240. For example, an indicator for audible label preferences for new and existing patients may be included in the patient profile in patient data 282, along with a visually impaired indicator that provides various visual state identifier 284 values. Example values may include: "No" (no visual impairment); "Yes—Large Font Only" (some visual impairment, but large font labels sufficient/preferred); and "Yes—Audible Label/Large Font (visual impairment, include both large font labels and audible label). Other visual state classification schemes may include additional indicators for complete vision loss, braille labels, quantified vision quality, and/or specific visual diagnoses. A patient's visually impaired indicator status may be maintained as part of the patient's central profile (enterprise patient data 282) in order to be available for any store filling scripts for the patient and may also be included as part of a local patient profile within security compliant pharmacy application 240. In some examples, the patient's visually impaired indicator status may be visible in an enterprise data interface, such as workflow system 290, for use throughout enterprise customer management services, including access through pharmacy computing system 230 during prescription fulfillment workflow and/or general customer service inquiries. Enterprise pharmacy data systems 216 may include a utility for generating, changing, or removing visual state identifiers for groups of customers as a batch. The audio label indicator may be stored at both the patient data 282 and prescription data 286 levels and may include a date, time, and location where the patient's visually impaired indicator was updated.

In some examples, the prescription fulfillment workflow in workflow system 290 and related computing interface on the pharmacy computing system may include one or more fields, identifiers, and/or indicators for pharmacist or other staff counseling. The counseling identifier may include a plurality of patient levels or conditions under which the customer should receive counseling at the time of prescription pickup. For example, workflow system 290 may invoke a rules engine similar to rules engine 258 for evaluating relevant patient data and/or status information. The counseling identifier may include a patient level indicator for audible label counselling. In some examples, the audible label counseling indicator may reflect whether or not the customer has previously received audible label counseling and/or is due for additional audible label counseling. For example, a default indicator value may be 'NO" (the customer has not received counseling), which will cause a counsel flag to be added to any prescriptions filled for the patient to state that they require counselling for the audible label. The counseling flag may be overridden by the pharmacist at the time of verification if needed. When the indicator is set to "YES" no counsel flag is created.

It may occur that some retail pharmacies are not enabled for handling RFID packaging, such as lacking RFID encoder 234 and/or RFID reader (e.g., NFC speaker equipment). Pharmacy application 240 may include an interface to locating pharmacies that includes pharmacy profiles. These pharmacy profiles may include an indicator for whether the pharmacy is enabled for visual labels. In addition, pharmacy computing system 230 may generate a pop-up message within the customer service and/or workflow interfaces for alerting a pharmacy/store not enabled for audible label during the following scenario:

(1) Adding a new patient and setting their visually impaired indicator to "Yes-Audible Label/Large Font"

(2) Transferring in a patient or prescription from enterprise pharmacy data system 216 that has their visually impaired indicator set to "Yes-Audible Label/Large Font"

(3) Entering a new script for a patient that has their visually impaired indicator set to "Yes-Audible Label/Large Font"

(4) When verifying a prescription for a patient that has their visually impaired indicator set to "Yes-Audible Label/Large Font"

In some examples, audible script templates 252 may include one or more audible script templates to provide a text script that may be converted into one or more audible human voice passages to deliver prescription label information, instructions, navigation information, and/or prompts for related pharmacy services or outreach. For example, audible script templates 252 may include a text layout that includes data field identifiers (placeholders) to be populated with text data values from encoded data 238 and additional sets of prescription label data from other sources. Audible script templates 252 may include natural language elements for presenting label data to the user, such as introductory, connecting, and conclusionary text phrases between data fields to make the delivery of the script in audible form sound more natural. Standard language providing directions, general information, standard cautionary or warning information, and general guidance on navigation options may also be included in audible script templates 252. In some examples, audible script templates may be customized to voice (voice commands received through the mobile device's voice interface or a virtual assistant application) and tactile (swiping, shaking, tilting, etc.) navigation indicators accepted by audible label engine 210. For example, audible script templates 252 may integrate instructions and markup to respond to voice and/or tactile navigation indicators to move between headings, anchors, field names, or other navigation elements in the audible script template. Audible script templates 252 may be further described with regard to data model 300 in FIG. 3 and mobile computing device 400 in FIG. 4.

In some examples, device interface 254 may include interface protocols for accessing input devices and/or output devices of mobile device 214, such as a touch screen (as both graphical user display and input device), microphones, speakers, motion sensors, etc. For example, device interface 254 may determine whether and how audible script templates are displayed visually and/or converted to audible human voice, as well as voice command and/or tactile navigation interfaces for some examples. In some examples, device interface 254 may use APIs provided by the mobile device operating system, libraries, and/or other applications to respond to or control device resources, functions, and/or events. In some examples, device interface 254 may render populated audio script templates 252 to be compatible with the menus, layout, and text prompts of the graphical user interface of mobile device 214 and pharmacy application 240. For example, device interface 254 may display a populated audible script template to support the use of a screen reader application or device function for text-to-voice converter 244 and delivery through a speaker output of mobile device 214. In some examples, pharmacy application 240 may include, integrate with, and/or access near-field reader 242 for mobile device 214. For example, device interface 254 may define interface functions for a near-field reader API provided by the device maker.

In some examples, the user may be able to access near-field reader 242 as an audible label reader from pharmacy application 240 to initiate audible label engine 210 for an audible label event. The user may use the pharmacy application prompts to initiate the scan of encoded data 238 from RFID package 218 using the native NFC functionality from a label reader function within the application. In some examples, device interface 254 may enable pharmacy application 240 to provide audio instructions directly or through the use of a screen reader functionality within the mobile device (e.g., TalkBack in iOS, Voice Over in Android, etc.). In some examples, the navigation and label information in audible script templates may be provided as both text information on the graphical user interface of mobile device 214 and as the audible message through the speakers or similar output device of mobile device 214. In some examples, the user may be able to play, pause, rewind, and otherwise navigate the audible information as an audio stream using voice and/or tactile navigation indicators. In some examples, once a scan is complete, pharmacy application 240 may prompt the user to scan again. The pharmacy application may or may not save data retrieved from encoded data 238 and/or remote sources in local data 246, depending on whether the storage and access configurations meet necessary data privacy and data permissions requirements. In some examples, mobile device 214 configured with appropriate data privacy, data permission, and user verification may store patient data and/or prescription data in local data 246 to enable future audible label events for the same RFID package 218 in an offline mode. For example, pharmacy application 240 may read encoded data 238 from the near-field memory device on the RFID package and store the information in local data 246, such as a non-volatile memory in mobile device 214.

In some examples, device interface 254 may include access to network 220 and/or telephone, text, electronic mail, or other application-based communication. Pharmacy application 240 may verify network connection to enterprise pharmacy data systems 216 and/or portions of the audible label engine accessible through enterprise pharmacy data system 216. If the connection is available, pharmacy application 240 and/or audible label engine 210 may operate in an online mode to access remote functional and/or data resources. One or more fields in the RFID tag may then be used as a key or index value to retrieve additional information from enterprise pharmacy data system 216 and/or other remote data sources, such as public data 298. In some examples, access to specific remote data resources may be based on user verification.

In some examples, login/verification 256 may enable pharmacy application 240, audible label engine 210, and/or enterprise pharmacy data systems 216 to verify that mobile device 214 is logged into and securely verified for access to personal and secure data. For example, login/verification 256 may include account, password, biometric, and/or other user verification to determine that user 222 is an authorized user of mobile device 214, such as the patient to whom the prescription was prescribed and/or a caregiver authorized for such access. Once login/verification 256 has successfully verified user 222, index values from encoded data 238 may be used to access additional verified-user classified information, such as patient data 282 and prescription data 286. For example, the prescription number may be used to access supplemental prescription information that was not included in the basic information on the RFID tag, such as extended warnings, usage information, condition information, drug conflicts and associated dosage timing restrictions, etc. that may otherwise be included in package inserts and information sheets. In some examples, audible label engine 210 may be configured to access unverified-user data regardless of whether login/verification 256 successfully verified user 222. In some examples, a combination of verified and unverified data may be used, such as verified user patient data (e.g., drug conflicts flagged in the patient profile) and unverified user drug data (e.g., publicly available adverse interaction data or warnings for correctly using or avoiding potentially adverse drug combinations indicated in the patient profile).

In some examples, verified-user data, such as patient data 282, may enable providing data and/or related offers for services based on prescriptions other than (or in addition to) the prescription in RFID package 218. For example, the patient may have multiple active prescriptions and the patient's profile may include a cross-reference of the prescriptions and one or more indicators for potential adverse drug interactions. The drug conflict data may include a clinically-determined schedule or calculated dosage time windows for taking each prescription medication in order to avoid adverse drug conflicts and meet drug separation requirements. Based on the user verification by login/verification 256, mobile device 214 may provide prescription information related to both prescriptions (or more than two if more than two prescriptions are involved) during an audible label event. For example, secondary prescription data retrieved from patient data 282 using the patient identifier may include a drug conflict warning and dosage schedule for both prescriptions (the prescription in RFID package 218 and at least one additional prescription for the same patient) that may be provided through mobile device 214.

In some examples, rules engine 258 may include a rules manager and a rules execution service for organizing and evaluating logical rules related to accessing resources for audible label engine 210. In some examples, the rules manager may organize a plurality of rule sets grouped by status conditions and/or the service or services that may use them. For example, unverified-user data access rules 260 may include a set of logical rules corresponding to what data fields may be accessed locally and/or remotely regardless of whether login-verification 256 has successfully verified user 222, such as publicly available drug data and/or pharmacy data. Patient data access rules 262 may include a set of logical rules corresponding to what patient data fields may be accessed locally and/or remotely when login-verification 256 has successfully verified user 222. Prescription data access rules 264 may include a set of logical rules corresponding to what prescription data fields may be accessed locally and/or remotely when user 22 is successfully verified. Offer evaluation rules 266 may include a set of logical rules corresponding to what pharmacy service offers may be offered through audible label engine 210, based on patient, prescription, and other data, to initiate one or more electronic transactions for the corresponding pharmacy service. In some examples, one or more rule sets may include additional logic for processing label data encoded on the RFID tag, additional data retrieved from other sources (e.g., enterprise pharmacy data systems 216), and/or a combination thereof to provide calculated values and insights on the prescription-level information, such as the number of refills remaining, whether the prescription is set up for automatic refills, days to expiration, dosing schedule, etc.

In some examples, the rules execution service may include logic for evaluating rules sets in the context of audible label events. For example, rules engine 258 may be called by pharmacy application 240 and/or audible label engine 210 to determine audible script template selection and available data fields for populating the audible script template based on systematically evaluating the rule sets in the rules manager based on encoded data 238, particularly index data, status information (e.g., online or offline, verified-user or unverified-user), and available local and remote resources.

In some examples, patient data available through patent data access rules 262 may be used to provide additional information for related prescriptions and services. For example, once the patient is identified from the RFID tag, audible label engine 210 may include logical rules that are evaluated by rules engine 258 to determine whether additional information related to other prescriptions, services, and/or offers therefore may be presented to the patient. In some examples, audible label engine 210 may gather information for use by the evaluation logic from enterprise data store 280, such as prescription status across a number of prescriptions, transaction history, active promotions, allergies, medical conditions, seasonal factors and trends, etc. In some examples, local health tracker data (e.g., smart device and health apps) may also be integrated into available information (with appropriate APIs and user permissions).

In some examples, pharmacy application 240 and/or enterprise pharmacy data systems 216 may include a number of other pharmacy services 296 that are complementary to accessing prescription information. Service access interface 268 may be configured to enable access to and/or initiate transactions with these other pharmacy services 296. These services may not be specifically enabled for audible navigation. Audible label engine 210 may provide an audible interface to these additional services as well as integrate the context of the recently read prescription label to assist in presenting and navigating services through offer text and navigation options added to audible script templates 252 responsive to offer evaluation rules 266. For example, pharmacy services 296 may include prescription reorder, prescription delivery, linkage to specific savings programs, subscription fill services, bundling additional prescriptions for refill/pickup, automating next refill, conversion to 90-day prescriptions, etc. In some examples, offers and services may relate to other prescriptions of the same patient based on additional prescription information available through the enterprise data. Additional pharmacy services, such as clinic services, flu shots, vaccines, non-prescription products, etc. may also be integrated into offer evaluation rules 266 and service access interface 268.

In some examples, outreach manager 270 may enable integration of communication outreach from audible script templates 252. For example, audio prompts and contact information may be included for pharmacy, pharmacist, prescriber, and/or insurance outreach. For example, contact information for a customer service resource may be included in the prescription, patient, drug, and/or pharmacy records or related profile information. Audio prompts for offering to contact one or more of the providers based on the context of the prescription being read may be stored in the selected audible script templates 252, along with the logical rules for offering those prompts. For example, when a refill is attempted but no refills remain, the audio prompt for outreach to the prescriber may be initiated. In some examples, patient and/or prescription information from the RFID label or related system retrieval may be used in the outreach to the provider, such as integrating prescription and patient information in an e-mail or text inquiry or accompanying a voice system navigation. The outreach may be initiated and conducted by accessing primary communication of mobile device 214 (e.g. initiating a telephone call), as a background operation within pharmacy application 240, and/or through an enterprise service, such as an automated refill service. Hours information in the contact profiles, such as store and pharmacy hours, may be used to select an active provider for immediate outreach, such as placing a call. In some examples, real-time customer service chat and/or call services may also be provided.

Audible prompts for other services may also be integrated in the audible navigation engine, such as location services for finding and providing directions to a nearby pharmacy, navigation instructions for retail spaces (pharmacy counter location, product location, etc.), audible payment and prepayment navigation (which may be integrated with digital wallets and similar applications supported by the mobile device), etc.

Figure 3:
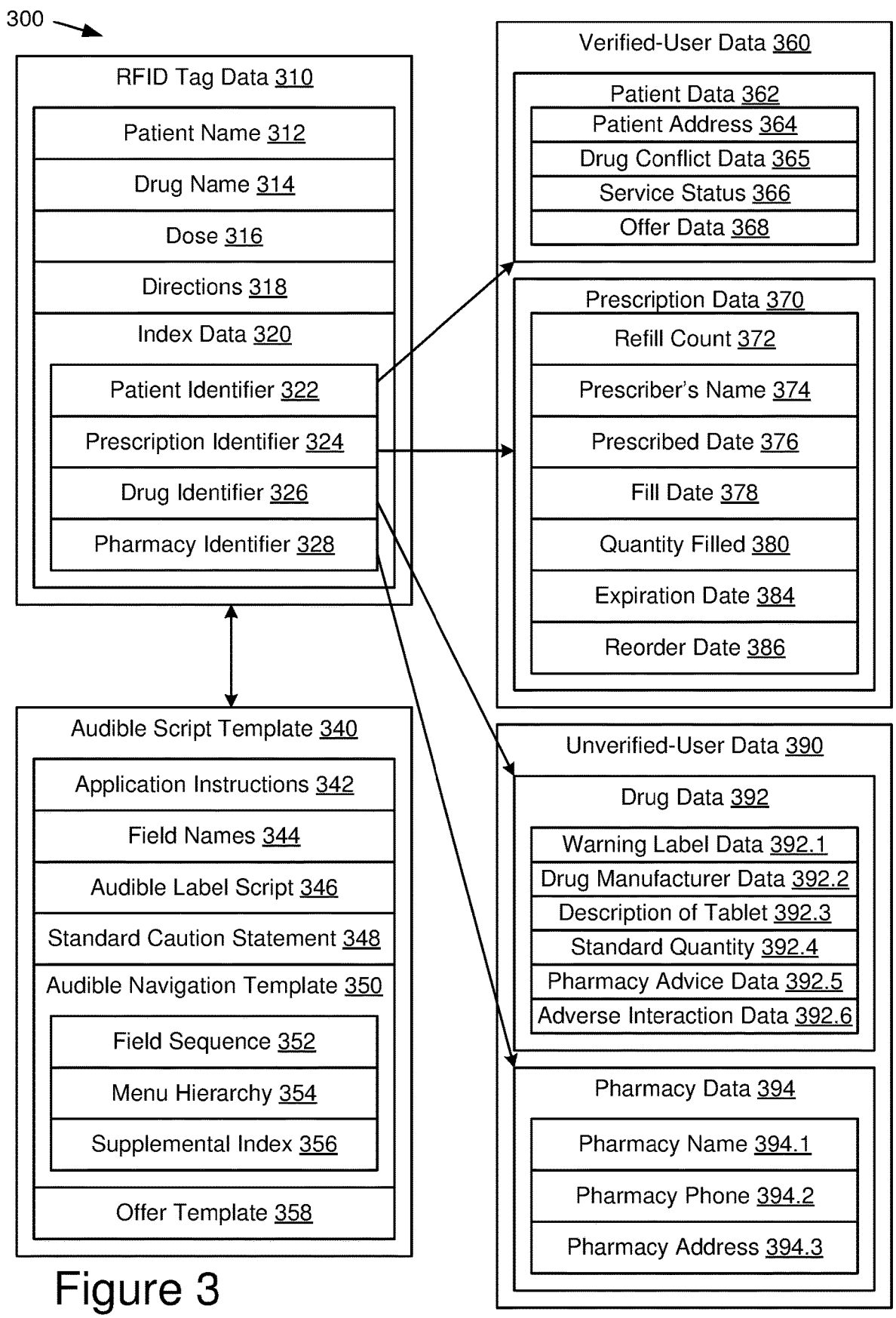
FIG. 3 schematically illustrates a prescription label information data model for use by a system, such as the system of FIG. 2.

FIG. 3 shows a prescription label information data model 300 for use by a system including an audible label engine, such as system 200 in FIG. 2. Data model 300 is provided as an example only and based on the data fields commonly found on prescription labels and in associated collateral. As discussed above, the range of data fields may be greatly expanded based on information available through real-time access to enterprise pharmacy data and other data sources. Note that a minimal set of prescription information data fields may be selected for inclusion in RFID tag data 310 in order to minimize the capacity requirements, cost, and encoding and validation time for each RFID package. In the example shown, data fields from sources other than the RFID tag have been classified by verification status for ease of determining which sets of data fields are available in verified-user and unverified-user states. Additional states could be used to organize sets of data fields, such as online and offline states, whether a prescription has been previously read (and data stored locally), and other factors.

RFID tag data 310 may include a set of prescription label information data fields that provide key information for enabling a useful but minimalist audible label event in the event that no additional data resources are available. For example, RFID tag data 310 may include patient name 312, drug name 314, dose 316, and directions 318. In addition, RFID tag data 310 may include index data 320. Index data 320 may include one or more unique identifiers that may be used to index one or more other data sources accessible to the audible label engine. For example, index data 320 may include patient identifier 322, prescription identifier 324, drug identifier 326, and pharmacy identifier 328. Patient identifier 322 may include a patient number or similar unique identifier used to track patient records in an enterprise pharmacy data system. Prescription identifier 324 may include a prescription number or similar unique identifier used to track prescription records in the enterprise pharmacy data system. Drug identifier 326 may include a national drug code, universal product code, or similar unique identifier for identifying specific drugs and their manufacturers. Pharmacy identifier 328 may include a pharmacy number of similar unique identifier used track pharmacy locations where prescriptions are filled. In some examples, index data 320 may not be accessible to a user and not included in audible script template 340. They may be internal system index values or keys for accessing other data sources and not meaningful to the user. In some examples, index data 320 may include a combination of user-accessible and hidden index data types.

Audible script template 340 may be an example audible script template stored or generated by an audible label engine for formatting and presenting prescription label information and/or other data fields accessed during an audible label event. For example, audible script template 340 may be stored as a form or series of forms using a markup language that includes text elements and field names or similar identifiers for populating data fields accessed from RFID tag data 310, verified-user data 360, and/or unverified-user data 390. For example, audible script template 340 may include: application instructions 342, which may include one or more text passages to support audible delivery of instructions for using the mobile device to read RFID tag data 310 and deliver and navigate the audible label content; field names 344, which may include field names or similar identifiers mapping to the field names in RFID tag data 310, verified-user data 360, and/or unverified-user data 390; audible label script 346 may include a combination of natural language elements and field names 344 to be populated with field values from RFID tag data 310, verified-user data 360, and/or unverified-user data 390 to deliver prescription label information in an easy-to-understand syntax; and/or standard caution statement 348 may include one or more text passages for delivering caution statements or other general information that may apply to multiple prescriptions. A populated audible script template may include predefined text elements, such as application instructions 342, field names 344, natural language elements from audible label script 346, and/or standard caution statement 348 combined with variable text elements, such as field data replacing placeholder field name location indicators in audible label script 346.

In some examples, audible script template 340 may enable audible navigation by including navigation features in an audible navigation template 350. For example, audible navigation template 350 may be integrated as navigation tags in the other portions of audible script template 340, such as audible label script 346, or provide in another portion of audible script template 340 that indicates how other sections are navigated. For example, a field sequence 352 may define a linear sequence of field names 344 and enable a user to navigate the audio stream using conventional audio stream navigation (play, stop, fast-forward, rewind, etc.) and use the sequence of field names for track skipping controls. In another example, a menu hierarchy 354 may be defined based on section names, headings, anchor tags, field names, and/or other values designating locations in audible script template, which may include classification of location types and organization into a navigation hierarchy similar to conventional menu navigation. Menu hierarchy 354 may be integrated application instructions 342 and/or provided as a separate section of audible script template 340 and may be associated with a standard voice command and/or tactile navigation indicator (e.g., up swipe) for repetition when needed by the user. In another example, a supplemental index 356 may be provided in audible navigation template and instructions for supplemental index 356 may follow delivery of basic prescription label information in audible label script 346. In some examples, supplemental index 356 may provide for delivery of additional prescription label data in response to navigation indicators. For example, the user may indicate that he or she wishes to hear the data fields in patient data 362, prescription data 370, drug data 392, pharmacy data 394, and/or specific fields or collections of fields defined therein, such as warning label data 392.1 and pharmacy advice data 392.5 for their prescription or pharmacy contact information from pharmacy data 394.

In some examples, audible script template 340 may enable audible offers for pharmacy services to be delivered to the user as part of audible label information delivery. For example, audible script template 340 may include, generate, or receive an offer template 358 to be appended to delivery of audible label script 346 or made available through audible navigation template 350. In some examples, text corresponding to a natural language offer and instructions for response, which may include a navigation instruction for immediately initiating the offered service through an electronic transaction supported by the pharmacy application, may be received by the audible label engine from one or more customer offer services supported by the enterprise pharmacy data systems. As discussed above, the audible label engine may include offer evaluation rules for determine whether, when, and how offer template 358 is added to audible script template 340.

In some examples, audible script template 340 may be one of a plurality of audible script templates that may apply to different sets of available RFID tag data 310, verified-user data 360, and/or unverified-user data 390 and/or be selected based on status values (online/offline, verified/unverified, etc.), prescription or patient types, and/or other template selection rules evaluated by the audible label engine. For example, the audible label engine may include a standard audible script template and template selection rules for selecting other templates, modifying one or more sections of the standard template, and/or dynamically generating a new template.

Data model 300 may include multiple sources of prescription label information that is not included in RFID tag data 310. For example, other data sources may include data stored locally on the mobile computing device or accessed through remote data sources, such as an enterprise pharmacy data system and/or public or third-party proprietary data servers. RFID tag data 310 may include index data 320 that provides an index or key for accessing a specific data record relevant to the prescription. For example, the audible label engine may include data access rules and an associated data path for reaching the data source and use one or more index values to query the data source.

In some examples, verified-user data 360 may be provided by an enterprise pharmacy data system and/or securely stored local data from the enterprise pharmacy data system. Verified-user data 362 may include patient data 362 and/or prescription data 370 corresponding to data fields stored in, for example, a patient profile and/or a prescription profile maintained in the pharmacy data system. In some examples, patient data 362 may be indexed by patient identifier 322 and enable retrieval of patient address 364, drug conflicts 365 (indicating potential drug conflicts and dosage timing based on other active prescriptions for the patient), service status 366 (indicating pharmacy services enabled or not enabled for the patient), and/or offer data 368 (indicating pending offers that may be offered to the patient). In some examples, prescription data 370 may be indexed by prescription identifier 324 and enable retrieval of refill count 372, prescriber's name 374, prescribed date 376, fill date 378, quantity filled 380, expiration date 384, and/or reorder date 386.

In some examples, unverified-user data 390 may be provided by the enterprise pharmacy data system, stored local data, and/or public or third-party proprietary data stores that do not require user verification for access, such as resources that are not subject to healthcare privacy restrictions and/or are publicly available. Unverified-user data 390 may include drug data 392 and pharmacy data 394 corresponding to generally available information relevant to the prescription. In some examples, drug data 392 may be indexed by drug identifier 326 and enable retrieval of warning label data 392.1, drug manufacturer data 392.2, description of tablet 392.3, standard quantity 392.4, pharmacy advice data 392.5, and/or adverse drug interaction data 929.6. In some examples, pharmacy data 394 may be indexed by a pharmacy identifier 328 and enable retrieval of pharmacy name 394.1, pharmacy phone 394.2, and/or pharmacy address 394.3.

Figure 4:
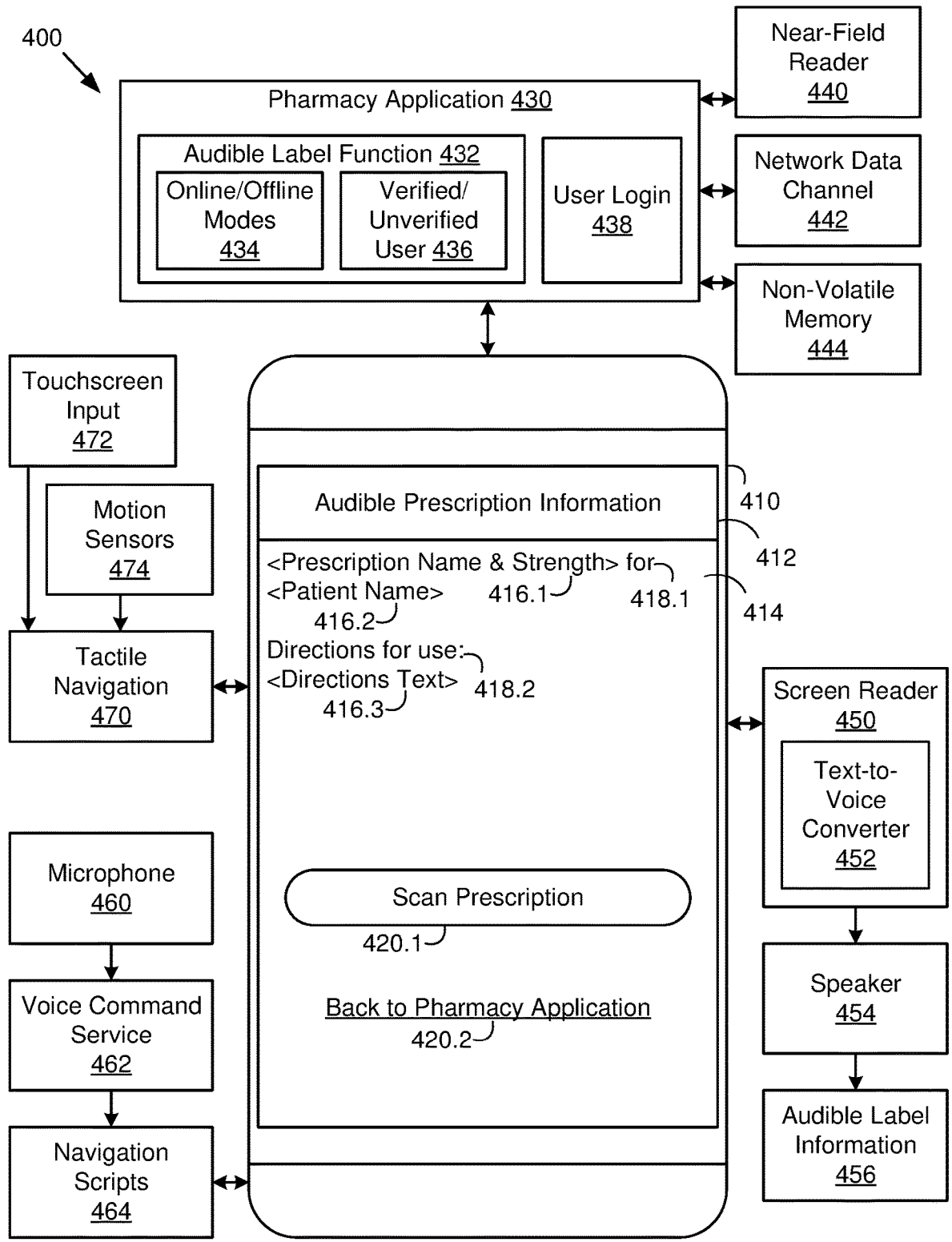
FIG. 4 schematically illustrates a mobile computing device configured for delivery of audible prescription label information.

FIG. 4 shows a mobile computing device 400 configured to provide audible prescription label information in response to a prescription package with a near-field memory device encoded with a set of prescription label information as described above. Mobile computing device 400 may include a graphical user interface display 410, such as a touchscreen, configured to display prescription label information according to an audible script template. Graphical user interface display 410 may include a header element 412 that may provide both visual and audible cueing and navigation, followed by an audible label script 414. Audible label script 414 may include a plurality of data fields 416 to be populated with data field values accessed from the near-field memory device and other sources. For example, data field 416.1 may receive the prescription drug name and strength data text values, data field 416.2 may receive the patient name text value, and data field 416.3 may receive the directions for use text value. Audible label script 414 may further include natural language text elements 418 for connecting the data field values into a natural language syntax. For example, natural language text element 418.1 may be "for" to connect the prescription drug name and strength text to the patient name text and natural language text element 418.2 may be "Directions for use:" to introduce the directions for use text value. When audible label script 414 is populated with prescription label data, graphical user interface display 410 may display and the user may hear "Audible Prescription Information. Drugname 5 milligrams for Jane Smith. Directions for use: Take one tablet daily with food."

In some examples, graphical user interface display 410 may include navigation elements 420. For example, navigation element 420.1 may include a graphical button that may be selected by touching the touchscreen in the vicinity of the button to initiate the scan of another RFID prescription package. Navigation element 420.2 may include a link that may be selected by touching the touchscreen in the vicinity of the link to return to a main menu of the pharmacy application that includes the audible label function. In some examples, navigation elements 420 may also be read to the user as an audible human voice and some screen readers may be configured to append instructions for selecting the navigation option. For example, the user may hear "Scan Prescription button. Swipe up or say 'scan prescription' to select. Back to Pharmacy Application link. Swipe down or say 'back to pharmacy application' to select."

As described with regard to FIG. 2, mobile computing device 400 may include a pharmacy application 430 that includes audible label function 432. Pharmacy application 430 may be configured to access various resources of mobile computing device 400, including software and hardware resources, for enabling audible label function 432. For example, pharmacy application 430 may access a near-field reader 440, network data channel 442, and/or local non-volatile memory 444. Near-field reader 440 may include a near-field sensor, related device driver or firmware, and an API to enable audible label function 432 to initiate near-field reader 440 and receive RFID tag data from a near-field memory device attached to a prescription container and within near-field proximity to mobile computing device 400. Network data channel 442 may include a network interface and protocols for a data communication network, such as the internet, that enables access to remote data sources, such as enterprise pharmacy data systems and other data servers. Non-volatile memory 444 may include a storage interface and protocols for accessing a non-volatile memory, such as flash memory, in mobile computing device 400 for storing application data in a local data store. Network data channel 442 and non-volatile memory 444 may enable audible label function 432 to access data sources other than the RFID tag data accessed through near-field reader 440.

Audible label function 432 may support a variety of operating modes or states related to data access. In some examples, audible label function 432 may support online and offline modes 434. Online and offline modes 434 may use a service of mobile computing device 400 to determine whether mobile computing device 400 has a network connection and network data channel 442 is available to audible label function 432. If no network connection is available, audible label function 432 may operate in offline mode and access prescription label information data only through near-field reader 440 and non-volatile memory 444. If a network connection is available, audible label function 432 may operate in online mode and also access prescription label information data through network data channel 442.

In some examples, audible label function 432 may support verified-user and unverified-user modes 436. Verified-user and unverified-user modes 436 may use a user login 438 or similar user verification/authentication function provided by pharmacy application 430 to verify that a user of mobile computing device 400 is an authorized user of the device and, in some examples, the patient associated with the prescription being read. For example, user login 438 may include a username, password, and/or other security features for enabling some or all functions of pharmacy application 430 and/or may interact with user verification interfaces and capabilities of mobile computing device 400, such as biometric identification (fingerprint, face identification, etc.). If the user is verified, audible label function 432 may operate in verified-user mode and access prescription label information from any data resource, including secure data resources that require verification. If the user is not verified, audible label function 432 may operate in a unverified-user mode and access only prescription label information from resources that do not require verification, such as generally available information related to the prescription. In some examples, operation in unverified-user mode may initiate a verification process using user login 438 to provide the user with an option to change to verified-user mode.

In some examples, audible label function 432 may use a screen reader 450 for converting text displayed on graphical user interface 410 to audible human voice. For example, mobile computing device 400 may include screen reader 450 as a native application, utility, or service supported by mobile computing device 400 and its operating system. In some examples, screen reader 450 may process the text displayed in audible label script 414 using text-to-voice converter 452 to generate an audio signal to speaker 454 to produce audible label information 456 in an audible human voice for the user. In some examples, speaker 454 may be internal to mobile computing device 400 or may be physically or wirelessly attached to mobile computing device 400, such as wired or wireless headphones, smart glasses, or external speakers.

In some examples, audible label function 432 may accept voice commands for navigation of audible label function 432 and delivered audible label information 456. For example, mobile computing device 400 may include voice command service 462 as a native application, utility, or service supported by mobile computing device 400 and its operating system. In some examples, voice command service 462 may receive audio signals through microphone 460, process them through voice recognition algorithms, and apply navigation scripts 464 to recognize and execute processes based on navigation indicators in the recognized speech. For example, voice command service 462 may be configured through a virtual assistant application in mobile computing device 400 and include a library of navigation scripts 464 associated with pharmacy application 430 for mapping command words or phrases to navigation actions in the context of pharmacy application 430. In some examples, microphone 460 may be internal to mobile computing device 400 or may be physically or wirelessly attached to mobile computing device 400, such as wired or wireless microphones.

In some examples, audible label function 432 may accept tactile navigation 470 to enable tactile navigation indicators that do not require the user to read or visually identify graphical elements on graphical user interface 410. For example, mobile computing device 400 may include tactile navigation 470 as a set of user interface (specifically, input devices) services for identifying tactile navigation indicators an raising those navigation indicators as events to the active application, such as pharmacy application 430. In some examples, mobile computing device 400 may monitor touchscreen input 472 for defined navigation indicators based on gross movements of fingers on the touchscreen, such as swipes, taps, double taps, and other finger movements based on general regions and directions of movement on graphical user interface 410, rather than tapping of specific visual elements such as buttons or links. In some examples, mobile computing device 400 may monitor motion sensors 474 for defined navigation indicators based on gross movements of mobile computing device 400 itself, such as shaking, tilts, and translations. Tactile navigation 470 may include navigation rules or scripts for interpreting tactile navigation indicators and using them to initiate actions for audible label function 432.

Figure 5A:
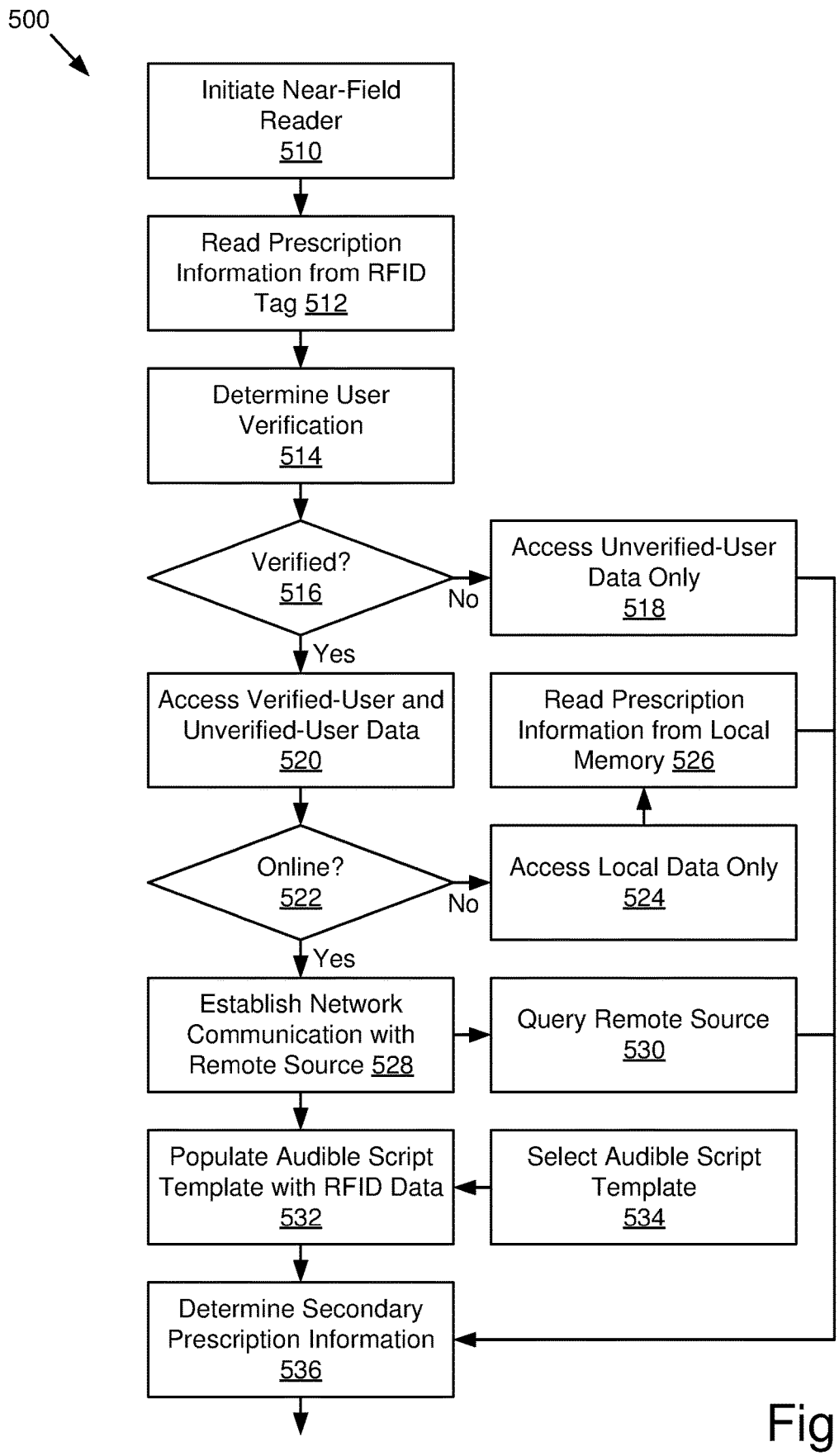
FIGS. 5a and 5b illustrates an example method for delivery of audible prescription label information.
Figure 5B:
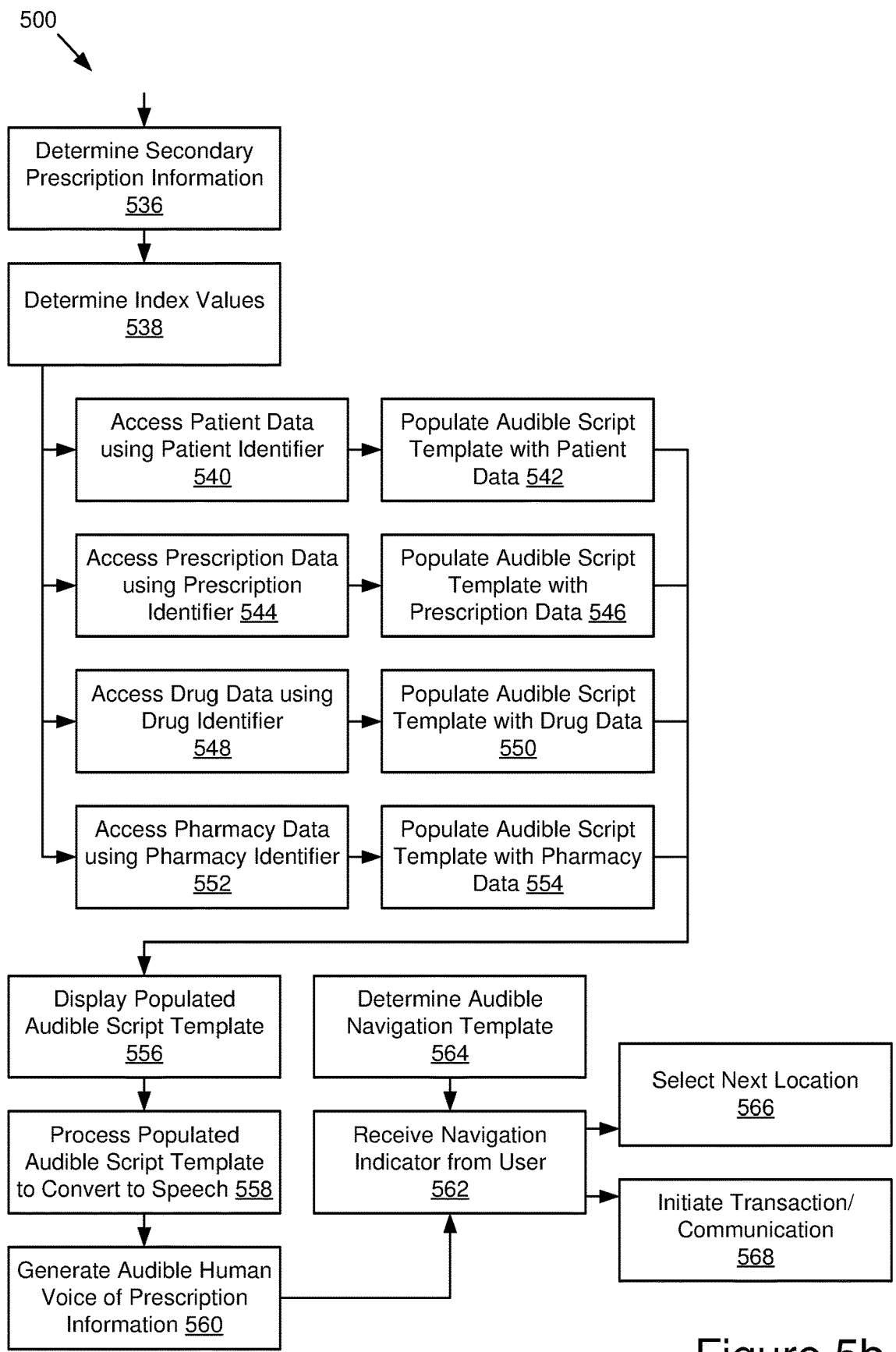

As shown in FIG. 5, including FIGS. 5*a* and 5*b*, system 200 may be operated according to an example method for delivery of audible prescription label information, i.e., according to the method 500 illustrated by blocks 510-568 of FIG. 5.

In block 510, a near-field reader is initiated. For example, a pharmacy application in a mobile computing device may initiate a near-field reader to start an audible label event for an audible label function.

At block 512, prescription information may be read from an RFID tag. For example, the near-field reader may read encoded data from a near-field memory device in the RFID tag that includes data fields and values for a set of prescription information.

At block 514, user verification may be determined. For example, the audible label function may check the login or other user verification status of the pharmacy application to determine whether the user of the mobile computing device is verified to be the patient or another authorized user of the prescription information. Verification status may be evaluated at block 516. If the user is not verified, method 500 may proceed to block 518. If the user is verified, method 500 may proceed to block 520.

At block 518, data access may be limited to unverified-user data only. For example, the audible label function may enter an unverified-user mode or status and that mode may influence the secondary prescription information determined at block 536.

At block 520, data access may be enabled for both verified-user and unverified-user data. For example, the audible label function may enter a verified-user mode or status and that mode may influence the secondary prescription information determined at block 536.

At block 522, whether the mobile computing device is online may be evaluated. For example, the audible label function may check whether a network data channel is available for communicating with remote data sources, such as an enterprise pharmacy data system. If no, method 500 may proceed to block 524. If yes, method 500 may proceed to block 528.

At block 524, data access may be limited to local data only. For example, the audible label function may enter an offline mode and only prescription information data fields from the RFID tag and those stored in the local memory of the mobile computing device may be accessed.

At block 526, prescription information may be read from local memory. For example, the audible label function may check the available prescription information data fields stored in the non-volatile memory of the mobile computing device and that may influence the secondary prescription information determined at block 536.

At block 528, network communication may be established with one or more remote sources. For example, the audible label function may establish network communication through a network data channel to an enterprise pharmacy data system and/or other remote data servers.

At block 530, remote data sources may be queried. For example, the audible label function may query one or more remote data sources to determine the availability of various data fields based on one or more index values included in the RFID tag. The available data fields may influence the secondary prescription information determined at block 536.

At block 532, an audible script template may be populated with prescription information data from the set read from the RFID tag. For example, an audible script template may include a series of data field indicators to be replaced with corresponding data values from the set of prescription information data values read from the RFID tag.

At block 534, an audible script template may be selected for an audible label function that supports multiple audible label scripts. For example, the audible label function may include a set of logical rules for evaluating mode or status, prescription type, available data fields, and other factors to select, modify, or generate the audible script template to be used for the audible label event.

At block 536, secondary prescription information may be determined. For example, the audible label function may determine a second set of prescription information that was not read from the RFID tag and may be used to populate the audible script template.

At block 538, at least one index value may be determined. For example, the audible label function may select one or more index values included in the RFID tag, such as patient identifier, prescription identifier, drug identifier, and/or pharmacy identifier, to use for accessing secondary prescription information from sources other than the RFID tag.

At block 540, patient data may be accessed using the patient identifier as an index value. For example, the audible label function may query a patient database for a patient record corresponding to the patient identifier and select one or more patient data fields and corresponding values from the patient record to use.

At block 542, the audible script template may be populated with patient data. For example, patient data values returned from the query may be mapped to data field indicators in the audible script template for the received patient data values or values derived therefrom.

At block 544, prescription data may be accessed using the prescription identifier as an index value. For example, the audible label function may query a prescription database for a prescription record corresponding to the prescription identifier and select one or more prescription data fields and corresponding values from the prescription record to use.

At block 546, the audible script template may be populated with prescription data. For example, prescription data values returned from the query may be mapped to data field indicators in the audible script template for the received prescription data values or values derived therefrom.

At block 548, drug data may be accessed using the drug identifier as an index value. For example, the audible label function may query a drug database for a drug record corresponding to the drug identifier and select one or more drug data fields and corresponding values from the drug record to use.

At block 550, the audible script template may be populated with drug data. For example, drug data values returned from the query may be mapped to data field indicators in the audible script template for the received drug data values or values derived therefrom.

At block 552, pharmacy data may be accessed using the pharmacy identifier as an index value. For example, the audible label function may query a pharmacy database for a pharmacy record corresponding to the pharmacy identifier and select one or more pharmacy data fields and corresponding values from the pharmacy record to use.

At block 554, the audible script template may be populated with pharmacy data. For example, pharmacy data values returned from the query may be mapped to data field indicators in the audible script template for the received pharmacy data values or values derived therefrom.

At block 556, the populated audible script template may be displayed. For example, the audible label function may display the populated audible script template on a graphical user interface of the mobile computing device.

At block 558, the populated audible script template may be processed to convert text to speech. For example, the audible label function may initiate a screen reader with text-to-voice capabilities.

At block 560, an audible human voice of the prescription information may be generated. For example, the screen reader may generate audible human speech for the text contents of the populated audible script template and deliver it through the speakers of the mobile computing device.

At block 562, a navigation indicator may be received from the user. For example, the mobile computing device may receive voice or tactile navigation commands from a user in response to audible delivery of the prescription information at block 560.

At block 564, an audible navigation template may be determined for a system supporting custom navigation indicators and scripts. For example, the audible label function may define a set of voice command scripts for a voice command service and/or navigation responses for tactile navigation indicators from the user.

At block 566, a next location in the populated audible script template may be selected. For example, responsive to a received navigation indicator, the audible label function may display and/or direct the screen reader to another portion of the populated audible script template.

At block 568, a pharmacy service transaction or outreach communication may be initiated. For example, responsive to a received navigation indicator, the audible label function may initiate a pharmacy service transaction by calling another pharmacy service of the pharmacy application or the enterprise pharmacy data system. As another example, responsive to a received navigation indicator, the audible label function may initiate outreach communication to a pharmacy representative, provider, insurance company, or other contact using the communication capabilities of the mobile computing device.

Figure 6:
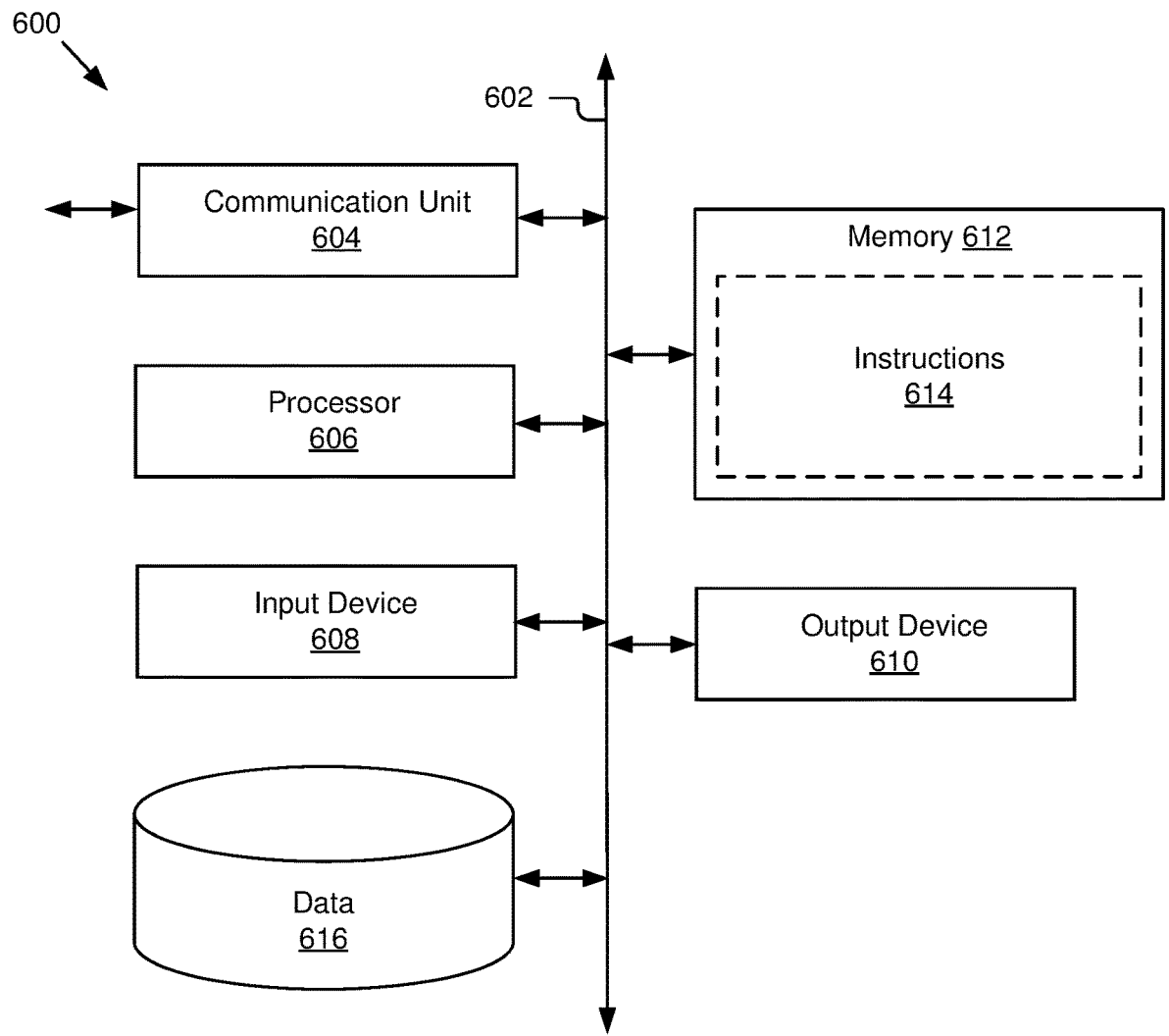
FIG. 6 schematically illustrates an example computing device.

FIG. 6 is a block diagram of an example computing device 600, which may represent the computer architecture of a pharmacy computing device, servers hosting enterprise pharmacy data systems and//or the audible navigation engine, and/or the customer's mobile device.

As depicted, the computing device 600 may include a processor 606, a memory 612, a communication unit 604, an input device 608, and an output device 610, which may be communicatively coupled by a bus 602. The computing device 600 depicted in FIG. 6 is provided by way of example and it should be understood that it may take other forms and include additional or fewer components without departing from the scope of the present disclosure. For instance, various components of the computing device 600 may be coupled for communication using a variety of communication protocols and/or technologies including, for instance, communication buses, software communication mechanisms, computer networks, etc. While not shown, the computing device 600 may include various operating systems, sensors, additional processors, and other physical configurations. The processor 606, memory 612, communication unit 604, etc., are representative of one or more of these components.

The processor 606 may execute software instructions by performing various input, logical, and/or mathematical operations. The processor 606 may have various computing architectures to process data signals (e.g., CISC, RISC, etc.). The processor 606 may be physical and/or virtual, and may include a single core or plurality of processing units and/or cores. In some implementations, the processor 606 may be coupled to the memory 612 via the bus 602 to access data and instructions 614 therefrom and store data therein. The bus 602 may couple the processor 606 to the other components of the computing device 600 including, for example, the memory 612, the communication unit 604, the input device 608, and the output device 610.

The memory 612 may store and provide access to data to the other components of the computing device 600. The memory 612 may be included in a single computing device or a plurality of computing devices. In some implementations, the memory 612 may store instructions 614 and/or data that may be executed by the processor 606. For example, the memory 612 may store one or more of the audible navigation engine, pharmacy application, workflow system, pharmacy services, etc. and their respective components, depending on the configuration. The memory 612 is also capable of storing other instructions and data, including, for example, an operating system, hardware drivers, other software applications, databases, etc. The memory 612 may be coupled to the bus 602 for communication with the processor 606 and the other components of computing device 600.

The memory 612 may include a non-transitory computer-usable (e.g., readable, writeable, etc.) medium, which can be any non-transitory apparatus or device that can contain, store, communicate, propagate or transport instructions 614, data, computer programs, software, code, routines, etc., for processing by or in connection with the processor 606. In some implementations, the memory 612 may include one or more of volatile memory and non-volatile memory (e.g., RAM, ROM, hard disk, optical disk, etc.). It should be understood that the memory 612 may be a single device or may include multiple types of devices and configurations. In some examples, computing system 600 may include or access one or more data stores 616, such as data stores configured in memory 612 and/or accessible via communication unit 604.

The bus 602 can include a communication bus for transferring data between components of a computing device or between computing devices, a network bus system including the network 220 or portions thereof, a processor mesh, a combination thereof, etc. In some implementations, the various components of the computing device 600 cooperate and communicate via a communication mechanism included in or implemented in association with the bus 602. In some examples, bus 602 may be a software communication mechanism including and/or facilitating, for example, inter-method communication, local function or procedure calls, remote procedure calls, an object broker (e.g., CORBA), direct socket communication (e.g., TCP/IP sockets) among software modules, UDP broadcasts and receipts, HTTP connections, etc. Further, communication between components of computing device 600 via bus 602 may be secure (e.g., SSH, HTTPS, etc.).

The communication unit 604 may include one or more interface devices (I/F) for wired and/or wireless connectivity among the components of the computing device 600. For instance, the communication unit 604 may include, but is not limited to, various types of known connectivity and interface options. The communication unit 604 may be coupled to the other components of the computing device 600 via the bus 602. The communication unit 604 can provide other connections to the network 220 and to other entities of the system 200 using various standard communication protocols.

The input device 608 may include any device for inputting information into the computing device 600. In some implementations, the input device 608 may include one or more peripheral devices. For example, the input device 608 may include a keyboard, a pointing device, microphone, an image/video capture device (e.g., camera), a touch-screen display integrated with the output device 610, etc. The output device 610 may be any device capable of outputting information from the computing device 600. The output device 610 may include one or more of a display (LCD, OLED, etc.), a printer, a 3D printer, a haptic device, audio reproduction device, touch-screen display, a remote computing device, etc. In some implementations, the output device 610 is a display which may display electronic images and data output by a processor, such as processor 606, of the computing device 600 for presentation to a user.

While the examples provided have been in the context of a retail pharmacy, other applications of the described systems and methods are also possible. For example, workstation allocation and related task management could be applied to retail store (or pharmacy "front store") operations or retail clinic operations. Other applications may include mail order pharmacies, long term care pharmacies, etc.

While at least one exemplary implementation has been presented in the foregoing detailed description of the technology, it should be appreciated that a vast number of variations may exist. It should also be appreciated that an exemplary implementation or exemplary implementations are examples, and are not intended to limit the scope, applicability, or configuration of the technology in any way. Rather, the foregoing detailed description will provide those skilled in the art with a convenient road map for executing an exemplary implementation of the technology, it being understood that various modifications may be made in a function and/or arrangement of elements described in an exemplary implementation without departing from the scope of the technology, as set forth in the appended claims and their legal equivalents.

As will be appreciated by one of ordinary skill in the art, various aspects of the present technology may be embodied as a system, method, or computer program product. Accordingly, some aspects of the present technology may take the form of an entirely hardware implementation, an entirely software implementation (including firmware, resident software, micro-code, etc.), or a combination of hardware and software aspects that may all generally be referred to herein as a circuit, module, system, and/or network. Furthermore, various aspects of the present technology may take the form of a computer program product embodied in one or more computer-readable mediums including computer-readable program code embodied thereon.

Any combination of one or more computer-readable mediums may be utilized. A computer-readable medium may be a computer-readable signal medium or a physical computer-readable storage medium. A physical computer readable storage medium may be, for example, but not limited to, an electronic, magnetic, optical, crystal, polymer, electromagnetic, infrared, or semiconductor system, apparatus, or device, etc., or any suitable combination of the foregoing. Non-limiting examples of a physical computer-readable storage medium may include, but are not limited to, an electrical connection including one or more wires, a portable computer diskette, a hard disk, random access memory (RAM), read-only memory (ROM), an erasable programmable read-only memory (EPROM), an electrically erasable programmable read-only memory (EEPROM), a Flash memory, an optical fiber, a compact disk read-only memory (CD-ROM), an optical processor, a magnetic processor, etc., or any suitable combination of the foregoing. In the context of this document, a computer-readable storage medium may be any tangible medium that can contain or store a program or data for use by or in connection with an instruction execution system, apparatus, and/or device.

Computer code embodied on a computer-readable medium may be transmitted using any appropriate medium, including but not limited to, wireless, wired, optical fiber cable, radio frequency (RF), etc., or any suitable combination of the foregoing. Computer code for carrying out operations for aspects of the present technology may be written in any static language, such as the C programming language or other similar programming language. The computer code may execute entirely on a user's computing device, partly on a user's computing device, as a stand-alone software package, partly on a user's computing device and partly on a remote computing device, or entirely on the remote computing device or a server. In the latter scenario, a remote computing device may be connected to a user's computing device through any type of network, or communication system, including, but not limited to, a local area network (LAN) or a wide area network (WAN), Converged Network, or the connection may be made to an external computer (e.g., through the Internet using an Internet Service Provider).

Various aspects of the present technology may be described above with reference to flowchart illustrations and/or block diagrams of methods, apparatus, systems, and computer program products. It will be understood that each block of a flowchart illustration and/or a block diagram, and combinations of blocks in a flowchart illustration and/or block diagram, can be implemented by computer program instructions. These computer program instructions may be provided to a processing device (processor) of a general purpose computer, special purpose computer, or other programmable data processing apparatus to produce a machine, such that the instructions, which can execute via the processing device or other programmable data processing apparatus, create means for implementing the operations/acts specified in a flowchart and/or block(s) of a block diagram.

Some computer program instructions may also be stored in a computer-readable medium that can direct a computer, other programmable data processing apparatus, or other device(s) to operate in a particular manner, such that the instructions stored in a computer-readable medium to produce an article of manufacture including instructions that implement the operation/act specified in a flowchart and/or block(s) of a block diagram. Some computer program instructions may also be loaded onto a computing device, other programmable data processing apparatus, or other device(s) to cause a series of operational steps to be performed on the computing device, other programmable apparatus or other device(s) to produce a computer-implemented process such that the instructions executed by the computer or other programmable apparatus provide one or more processes for implementing the operation(s)/act(s) specified in a flowchart and/or block(s) of a block diagram.

A flowchart and/or block diagram in the above figures may illustrate an architecture, functionality, and/or operation of possible implementations of apparatus, systems, methods, and/or computer program products according to various aspects of the present technology. In this regard, a block in a flowchart or block diagram may represent a module, segment, or portion of code, which may comprise one or more executable instructions for implementing one or more specified logical functions. It should also be noted that, in some alternative aspects, some functions noted in a block may occur out of an order noted in the figures. For example, two blocks shown in succession may, in fact, be executed substantially concurrently, or blocks may at times be executed in a reverse order, depending upon the operations involved. It will also be noted that a block of a block diagram and/or flowchart illustration or a combination of blocks in a block diagram and/or flowchart illustration, can be implemented by special purpose hardware-based systems that may perform one or more specified operations or acts, or combinations of special purpose hardware and computer instructions.

While one or more aspects of the present technology have been illustrated and discussed in detail, one of ordinary skill in the art will appreciate that modifications and/or adaptations to the various aspects may be made without departing from the scope of the present technology, as set forth in the following claims.

What is claimed is:

1. A system, comprising:
   a near-field memory device attached to a prescription container, wherein:
   the near-field memory device is configured to store a first set of prescription label information encoded as label data fields and corresponding field values; and
   the near-field memory device has a capacity selected to store the first set of prescription label information; and
   a mobile computing device comprising:
   a processor;
   a memory configured to store a plurality of audible script templates, wherein each audible script template of the plurality of audible script templates comprises:
   a first set of template data fields for that audible script template corresponding to label data fields from the first set of prescription label information;
   a second set of template data fields for that audible script template corresponding to label data fields from a second set of prescription label information not encoded in the near-field memory device and exceeding the capacity of the near-field memory device; and
   a plurality of natural language elements for that audible script template configured to merge field values from the first set of template data fields and the second set of template data fields into a spoken language script for that audible script template;

a near-field reader configured to:
  receive a signal from the near-field memory device that encodes the first set of prescription label information from the near-field memory device; and
  decode the label data fields and corresponding field values to a text format;
a communication unit configured for network communication with at least one remote data server hosting at least one remote prescription label information source;
a graphical user interface display; and
a speaker;
wherein the mobile computing device is configured to, responsive to the signal from the near-field memory device:
  determine a status of the communication unit corresponding to whether the communication unit has a network connection to the at least one remote data server, wherein the status is selected from an online mode and an offline mode;
  conditionally select, based on the status of the communication unit being the online mode, a first audible script template from the plurality of audible script templates to be a selected audible script template;
  conditionally select, based on the status of the communication unit being the offline mode, a second audible script template from the plurality of audible script templates to be the selected audible script template;
  generate an instance of the selected audible script template in the memory of the mobile computing device;
  read, from the near-field memory device, the first set of prescription label information into the first set of template data fields in the memory to populate the first set of template data fields;
  selectively read, responsive to reading the first set of prescription label information and based on an index value in the first set of prescription label information, the second set of prescription label information from stored local data into the second set of template data fields in the memory to populate the second set of template data fields, wherein selectively reading the second set of prescription label information from the stored local data is further responsive to determining the status of the communication unit to be the offline mode;
  selectively receive, responsive to reading the first set of prescription label information and based on the index value in the first set of prescription label information, the second set of prescription label information from the at least one remote prescription label information source accessible through the communication unit, wherein selectively receiving the second set of prescription label information from the at least one remote prescription label information source is further responsive to determining the status of the communication unit to be the online mode;
  merge, using the plurality of natural language elements in the selected audible script template, the first set of prescription label information in the first set of template data fields and the second set of prescription label information in the second set of template data fields into a populated audible script template in the memory;
  display, on the graphical user interface display, the populated audible script template from the memory as a formatted sequence of text arranging the first set of data fields, the second set of data fields, and the plurality of natural language elements in an order defined by the selected audible script template;
  sequentially convert, using text-to-voice conversion, the formatted sequence of text displayed on the graphical user interface display to an audio signal; and
  generate, by the speaker and using the audio signal, an audible human voice delivering the formatted sequence of text from the populated audible script template as an audible user interface of the mobile computing device.

2. The system of claim 1, wherein:
the mobile computing device further comprises a local non-volatile memory configured to store at least a portion of the second set of prescription label information as the stored local data; and
the mobile computing device is further configured to populate the second set of template data fields in the memory by:
  accessing, from the local non-volatile memory and using the index value, at least a portion of the second set of prescription label information; and
  writing, to the second set of template data fields in the memory, the portion of the second set of prescription label information.

3. The system of claim 1, wherein:
the mobile computing device is further configured to, responsive to determining the status of the communication unit to be the online mode, populate the second set of template data fields in the memory by:
  querying, from the at least one remote prescription label information source, at least a portion of the second set of prescription label information;
  receiving, responsive to the querying, the portion of the second set of prescription label information;
  storing the portion of the second set of prescription label information as stored local data; and
  writing, to the second set of template data fields in the memory, the portion of the second set of prescription label information.

4. The system of claim 1, wherein the mobile computing device is further configured to, responsive to the signal from the near-field memory device:
  determine whether a user has been verified for access to a verified-user portion of the second set of prescription information;
  conditionally select, responsive to determining that the user has been verified for access, the first audible script template and the second audible script template from audible script templates in the plurality of audible script templates that include a verified-user portion of the second set of prescription information;
  selectively access, responsive to determining that the user has been verified for access, the verified-user portion of the second set of prescription information for populating the selected audible script template;
  conditionally select, responsive to determining that the user has not been verified for access, the first audible script template and the second audible script template from audible script templates in the plurality of audible script templates that include an unverified-user portion of the second set of prescription information; and selectively access, responsive to determining that the user has not been verified for access, the unverified-user portion of the second set of prescription information for populating the selected audible script template.

5. The system of claim 1, wherein:
the first set of prescription information comprises at least one index value; and
the mobile computing device is further configured to use the at least one index value to access at least a portion of the second set of prescription information.

6. The system of claim 5, wherein:
the at least one index value comprises a patient identifier associated with the prescription container; and
the second set of prescription information comprises patient data not encoded in the first set of prescription information.

7. The system of claim 6, wherein:
the second set of prescription information comprises a service status and offer data associated with the patient identifier; and
the mobile computing device is further configured to:
populate, using the offer data, an offer template for pharmacy services in the selected audible script template, wherein:
the offer template comprises audible navigation features including a navigation indicator to accept the offer in the offer template; and
the audible user interface presents the offer and the audible navigation features through the speaker;
receive, from a user, the navigation indicator to accept an offer in the offer template; and
initiate, responsive to receiving the navigation indicator, an electronic transaction based on the offer.

8. The system of claim 6, wherein:
the first set of prescription information relates to a first prescription for a patient; and
the second set of prescription information comprises drug conflict data associated with:
the patient identifier;
the first prescription for the patient; and
at least one different prescription for the patient.

9. The system of claim 5, wherein:
the at least one index value comprises a prescription identifier associated with the prescription container; and
the second set of prescription information comprises prescription data not encoded in the first set of prescription information.

10. The system of claim 5, wherein:
the at least one index value comprises a drug identifier associated with the prescription container;
the second set of prescription information comprises drug data not encoded in the first set of prescription information; and
the drug data in the second set of prescription information is selected from:
warning label data;
drug manufacturer data;
description of tablet;
pharmacy advice data; and
adverse drug interaction data.

11. The system of claim 5, wherein:
the at least one index value comprises a pharmacy identifier associated with the prescription container;
the second set of prescription information comprises pharmacy data not encoded in the first set of prescription information; and
the mobile computing device is further configured to:
populate, using the pharmacy data, an offer template in the selected audible script template for contacting a pharmacy associated with the pharmacy identifier, wherein:
the offer template comprises audible navigation features to offer contacting the pharmacy and including a navigation indicator to accept contacting the pharmacy; and
the audible user interface presents an offer to contact the pharmacy and audible navigation features through the speaker;
receive, from a user, the navigation indicator to accept contacting the pharmacy; and
initiate, responsive to receiving the navigation indicator, a telephone call to the pharmacy.

12. The system of claim 1, wherein the audible script template is configured to:
determine a field sequence for the field values from the first set of template data fields and the second set of template data fields; and
position, relative to the natural language elements, the field values from the first set of template data fields and the second set of template data fields.

13. The system of claim 1, wherein:
the first set of prescription information and the second set of prescription information correspond to prescription data fields;
the audible script template comprises at least one audible navigation template configured to organize the prescription data fields for navigation by a user; and
the mobile computing device is further configured to:
receive, from a user, a navigation indicator responsive to the audible script template; and
select, based on the navigation indicator, a next location in the audible script template to deliver through the speaker.

14. The system of claim 1, further comprising:
a pharmacy computing system configured to:
determine an encoder data feed for the prescription container, wherein the encoder data feed comprises the first set of prescription information;
encode the first set of prescription information from the encoder data feed to the near-field memory device; and
validate that the first set of prescription information is stored in the near-field memory device.

15. A computer-implemented method, comprising:
receiving, by a mobile computing device, a signal that encodes a first set of prescription label information from a near-field memory device attached to a prescription container, wherein the near-field memory device has a capacity selected to store the first set of prescription label information;
determining, by the mobile computing device, a status of a communication unit of the mobile computing device configured for network communication with at least one remote data server hosting at least one remote prescription label information source, wherein the status:
corresponds to whether the communication unit has a network connection to the at least one remote data server; and
the status is selected from an online mode and an offline mode;
conditionally selecting, by the mobile computing device and based on the status of the communication unit being the online mode, a first audible script template from a plurality of audible script templates to be a selected audible script template;

conditionally selecting, by the mobile computing device and based on the status of the communication unit being the offline mode, a second audible script template from the plurality of audible script templates to be the selected audible script template;

generating, by the mobile computing device, an instance of the selected audible script template in a memory of the mobile computing device, wherein the selected audible script template comprises:
  a first set of template data fields corresponding to label data fields from the first set of prescription label information encoded as label data fields and corresponding field values in the near-field memory device attached to the prescription container;
  a second set of template data fields corresponding to label data fields from a second set of prescription label information not encoded in the near-field memory device and exceeding the capacity of the near-field memory device; and
  a plurality of natural language elements configured to merge field values from the first set of template data fields and the second set of template data fields into a spoken language script;

decoding, by the mobile computing device, the received signal to text values for the label data fields and corresponding field values of the first set of prescription label information to populate the first set of template data fields in the memory;

selectively reading, by the mobile computing device, responsive to decoding the first set of prescription label information and based on an index value in the first set of prescription label information, the second set of prescription label information from stored local data into the second set of template data fields in the memory to populate the second set of template data fields, wherein selectively reading the second set of prescription label information from the stored local data is further responsive to determining the status of the communication unit to be the offline mode;

selectively receiving, by the mobile computing device, responsive to decoding the first set of prescription label information and based on the index value in the first set of prescription label information, the second set of prescription label information from the at least one remote prescription label information source accessible through the communication unit, wherein selectively receiving the second set of prescription label information from the at least one remote prescription label information source is further responsive to determining the status of the communication unit to be the online mode;

merging, by the mobile computing device and using the plurality of natural language elements in the selected audible script template, the first set of prescription label information in the first set of template data fields and the second set of prescription label information in the second set of template data fields into a populated audible script template in the memory;

displaying, on a graphical user interface display of the mobile computing device, the populated audible script template from the memory as a formatted sequence of text arranging the first set of data fields, the second set of data fields, and the plurality of natural language elements in an order defined by the selected audible script template;

sequentially converting, by the mobile computing device and using text-to-voice conversion, the formatted sequence of text displayed on the graphical user interface display to an audio signal; and generating, by the mobile computing device and using the audio signal, an audible human voice delivering the formatted sequence of text from the populated audible script template as an audible user interface of the mobile computing device.

16. The computer-implemented method of claim 15, further comprising:
  accessing, from a local non-volatile memory of the mobile computing device and using the index value, at least a portion of the second set of prescription label information as the stored local data; and
  writing, to the second set of template data fields in the memory, the portion of the second set of prescription label information to populate the second set of template data fields.

17. The computer-implemented method of claim 15, further comprising:
  establishing, by the mobile computing device, network communication with the at least one remote data server hosting the at least one remote prescription label information source;
  querying, by the mobile computing device and responsive to determining the status of the communication unit to be the online mode, from the at least one remote prescription label information source and using the index value, at least a portion of the second set of prescription label information;
  receiving, responsive to the querying, the portion of the second set of prescription label information;
  storing the portion of the second set of prescription label information as stored local data; and
  writing, to the second set of template data fields in the memory, the portion of the second set of prescription label information.

18. The computer-implemented method of claim 16, wherein accessing the second set of prescription label information comprises:
  determining, by the mobile computing device, whether a user has been verified for access to a verified-user portion of the second set of prescription information;
  conditionally selecting, by the mobile computing device and responsive to determining that the user has been verified for access, the first audible script template and the second audible script template from audible script templates in the plurality of audible script templates that include a verified-user portion of the second set of prescription information;
  selectively accessing, by the mobile computing device and responsive to determining that the user has been verified for access, the verified-user portion of the second set of prescription information for populating the selected audible script template;
  conditionally selecting, by the mobile computing device and responsive to determining that the user has not been verified for access, the first audible script template and the second audible script template from audible script templates in the plurality of audible script templates that include an unverified-user portion of the second set of prescription information; and selectively accessing, by the mobile computing device and responsive to determining that the user has not been verified for access, the unverified-user portion of the second set of prescription information for populating the selected audible script template.

19. The computer-implemented method of claim 15, further comprising:
determining at least one index value from the first set of prescription information; and
using the at least one index value to access at least a portion of the second set of prescription information.

20. A mobile computing device, comprising:
a processor;
a memory configured to store a plurality of audible script templates, wherein each audible script template of the plurality of audible script templates comprises:
  a first set of template data fields for that audible script template corresponding to label data fields from a first set of prescription label information encoded in a near-field memory device attached to a prescription container;
  a second set of template data fields for that audible script template corresponding to label data fields from a second set of prescription label information not encoded in the near-field memory device and exceeding a capacity of the near-field memory device; and
  a plurality of natural language elements for that audible script template configured to merge field values from the first set of template data fields and the second set of template data fields into a spoken language script for that audible script template;
a near-field reader configured to:
  receive a signal that encodes the first set of prescription label information from the near-field memory device, wherein the capacity of the near-field memory device is configured to store the first set of prescription label information; and
  decode, from the signal, label data fields and corresponding field values in text format corresponding to the first set of prescription label information;
a communication unit configured for network communication with at least one remote data server hosting at least one remote prescription label information source;
a graphical user interface display;
a speaker;
a text-to-voice converter configured to:
  generate an audio signal for audible human voice from text data; and
  send the audio signal to the speaker to deliver the audible human voice through the speaker; and
an audible label function configured to, responsive to the signal from the near-field memory device:
  determine a status of the communication unit corresponding to whether the communication unit has a network connection to the at least one remote data server, wherein the status is selected from an online mode and an offline mode;
  conditionally select, based on the status of the communication unit being the online mode, a first audible script template from the plurality of audible script templates to be a selected audible script template;
  conditionally select, based on the status of the communication unit being the offline mode, a second audible script template from the plurality of audible script templates to be the selected audible script template;
  generate an instance of the selected audible script template in the memory;
  read, using the near-field reader, the first set of prescription label information from the near-field memory device into the first set of template data fields in the memory to populate the first set of template data fields;
  selectively read, responsive to the first set of prescription label information and based on an index value in the first set of prescription label information, the second set of prescription label information from stored local data into the second set of template data fields in the memory to populate the second set of template data fields, wherein reading the second set of prescription label information from the stored local data is further responsive to determining the status of the communication unit to be the offline mode;
  selectively receive, responsive to reading the first set of prescription label information and based on the index value in the first set of prescription label information, the second set of prescription label information from the at least one remote prescription label information source accessible through the communication unit, wherein selectively receiving the second set of prescription label information from the at least one remote prescription label information source is further responsive to determining the status of the communication unit to be the online mode;
  merge, using the plurality of natural language elements in the selected audible script template, the first set of prescription label information in the first set of template data fields and the second set of prescription label information in the second set of template data fields into a populated audible script template in the memory;
  display, on the graphical user interface display, the populated audible script template from the memory as a formatted sequence of text arranging the first set of data fields, the second set of data fields, and the plurality of natural language elements in an order defined by the selected audible script template; and
  initiate the text-to-voice converter to:
    sequentially convert the formatted sequence of text displayed on the graphical user interface display to a corresponding audio signal; and
    send the corresponding audio signal to the speaker to deliver, through the speaker, audible human voice delivering the formatted sequence of text of the populated audible script template as an audible user interface of the mobile computing device.

21. The mobile computing device of claim 20, wherein the audible label function is further configured to:
establish network communication with the at least one remote data server hosting the at least one remote prescription label information source;
query, responsive to determining the status of the communication unit to be the online mode, from the at least one remote prescription label information source and using the index value, at least a portion of the second set of prescription label information;
receive, responsive to the querying, the portion of the second set of prescription label information;
store the portion of the second set of prescription label information as stored local data; and write, to the second set of template data fields in the memory, the portion of the second set of prescription label information.

\* \* \* \* \*